Sept. 25, 1945.  W. S. CORBIN ET AL  2,385,692
CONTINUOUS WINDING MACHINE
Filed April 7, 1942   14 Sheets-Sheet 3
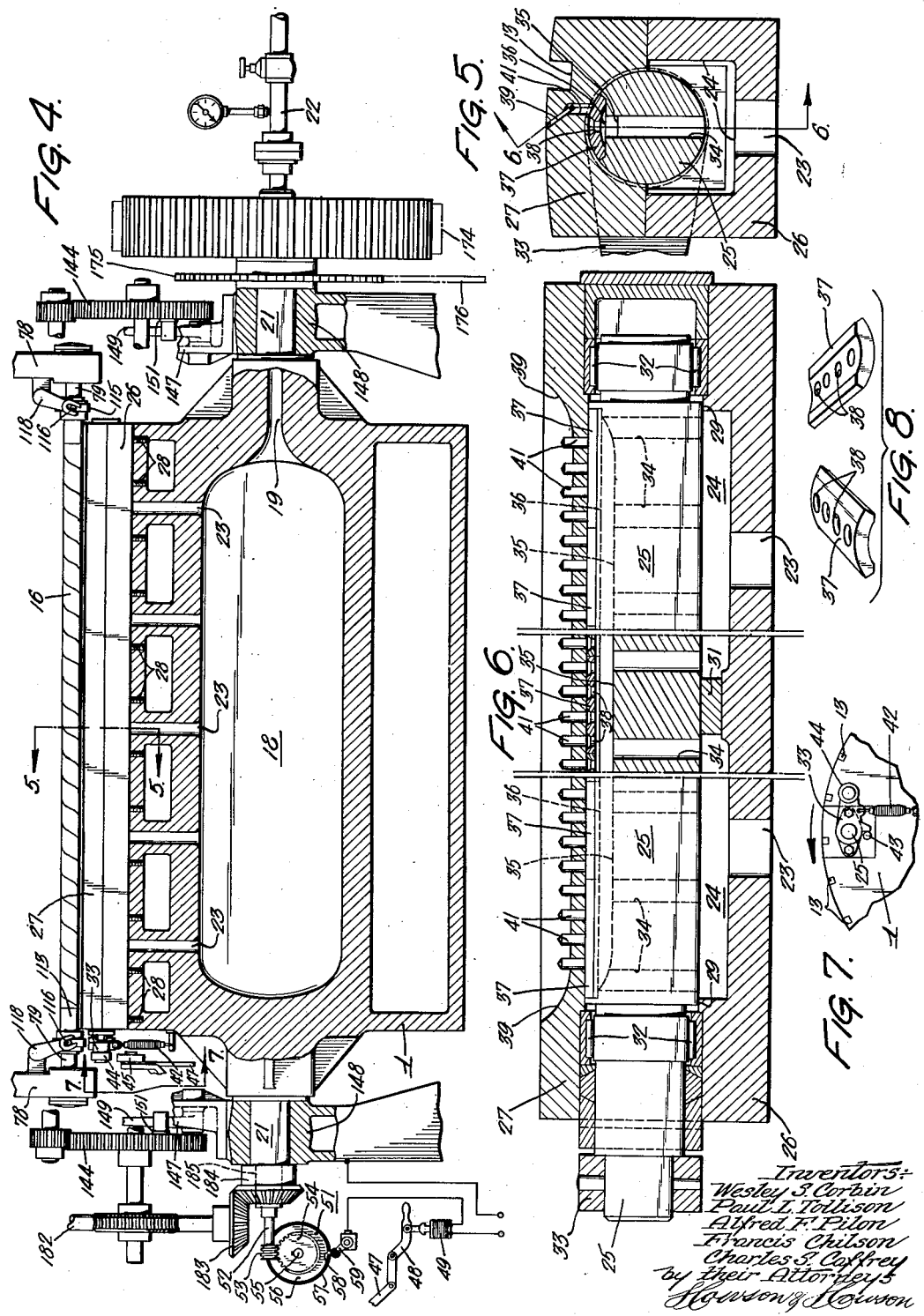

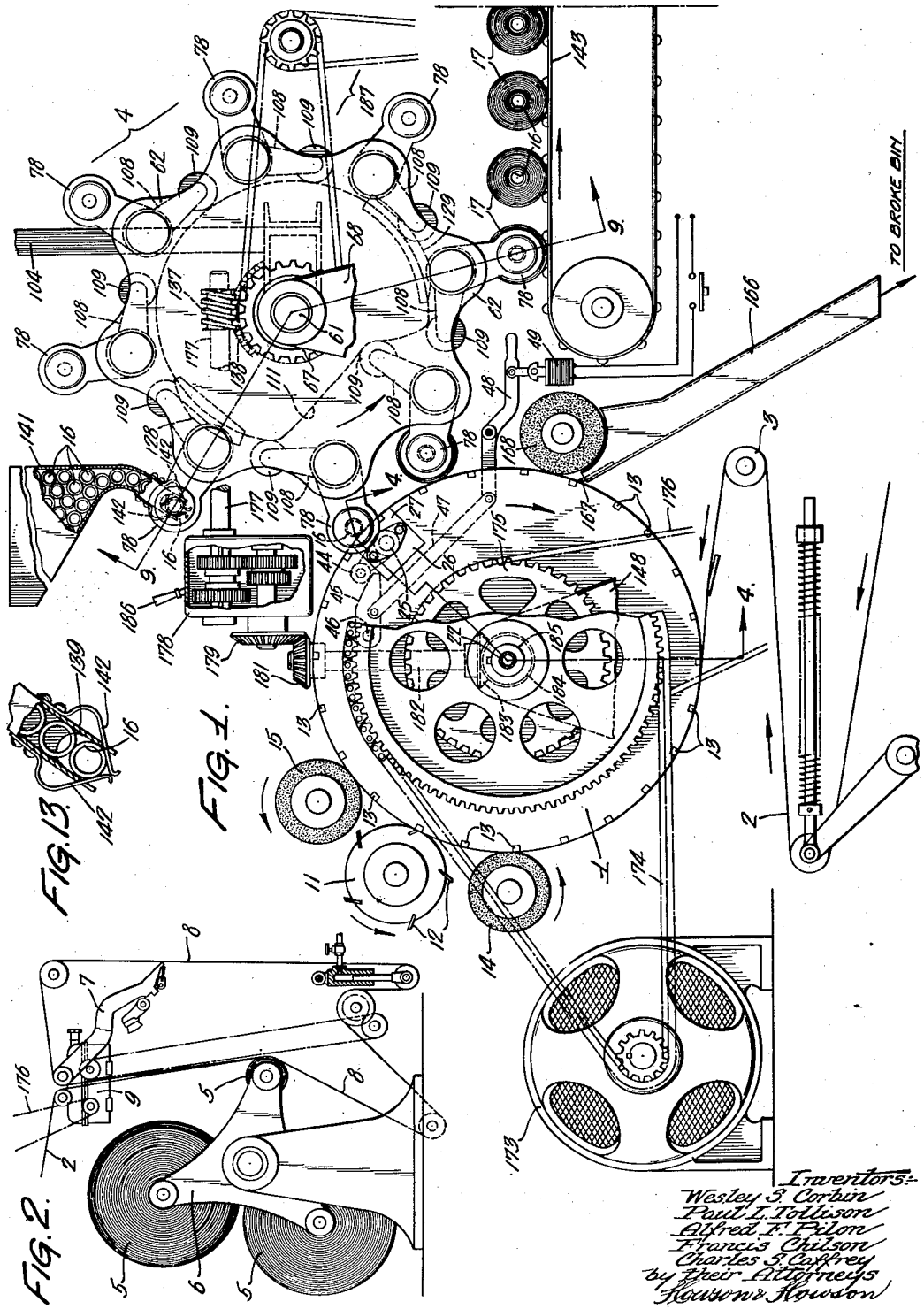

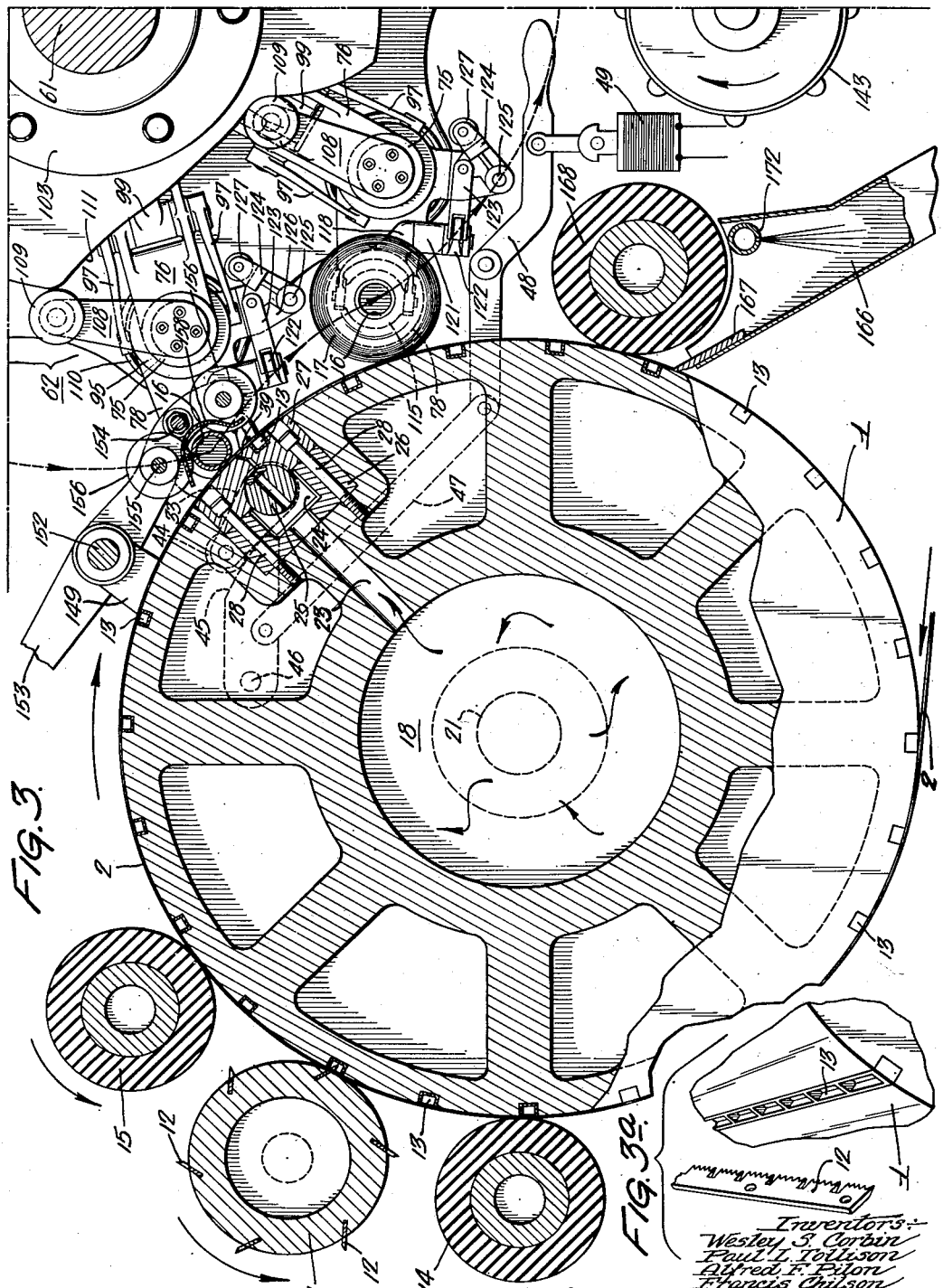

Sept. 25, 1945.  W. S. CORBIN ET AL  2,385,692
CONTINUOUS WINDING MACHINE
Filed April 7, 1942   14 Sheets-Sheet 5

Inventors:
Wesley S. Corbin, Paul L. Tollison,
Alfred F. Pilon, Francis Chilson,
& Charles J. Coffey, by their Attorneys
Howson & Howson

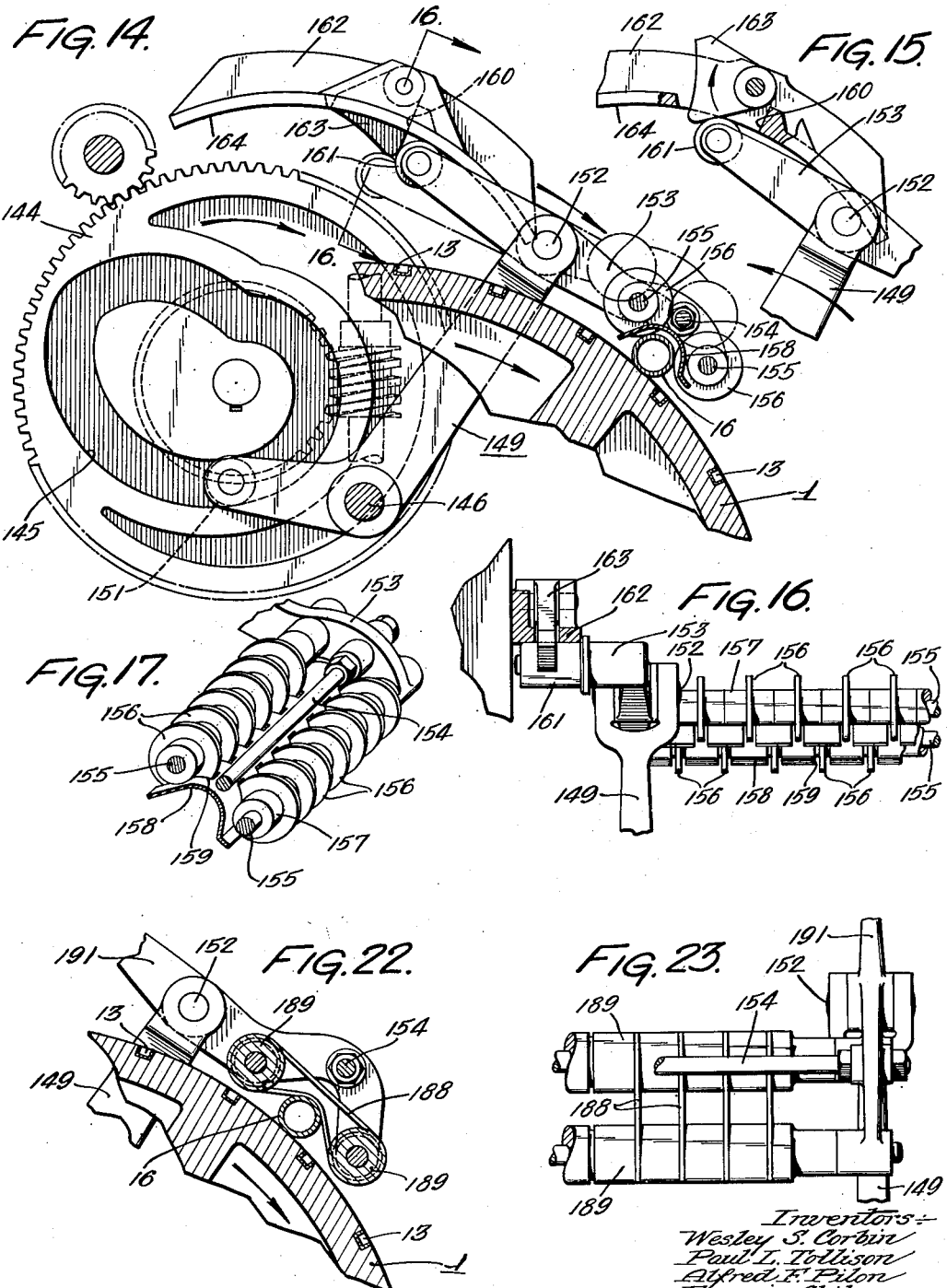

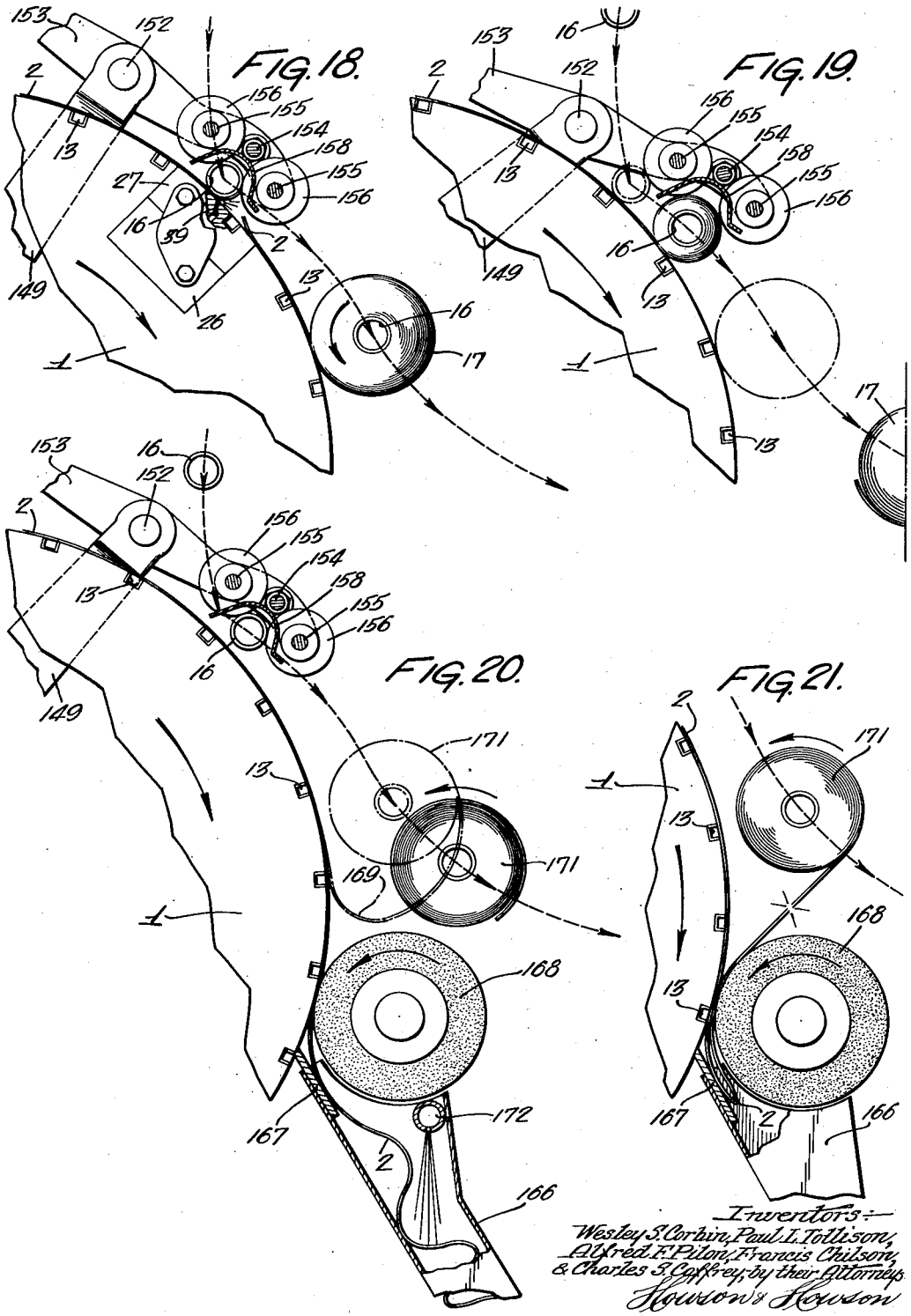

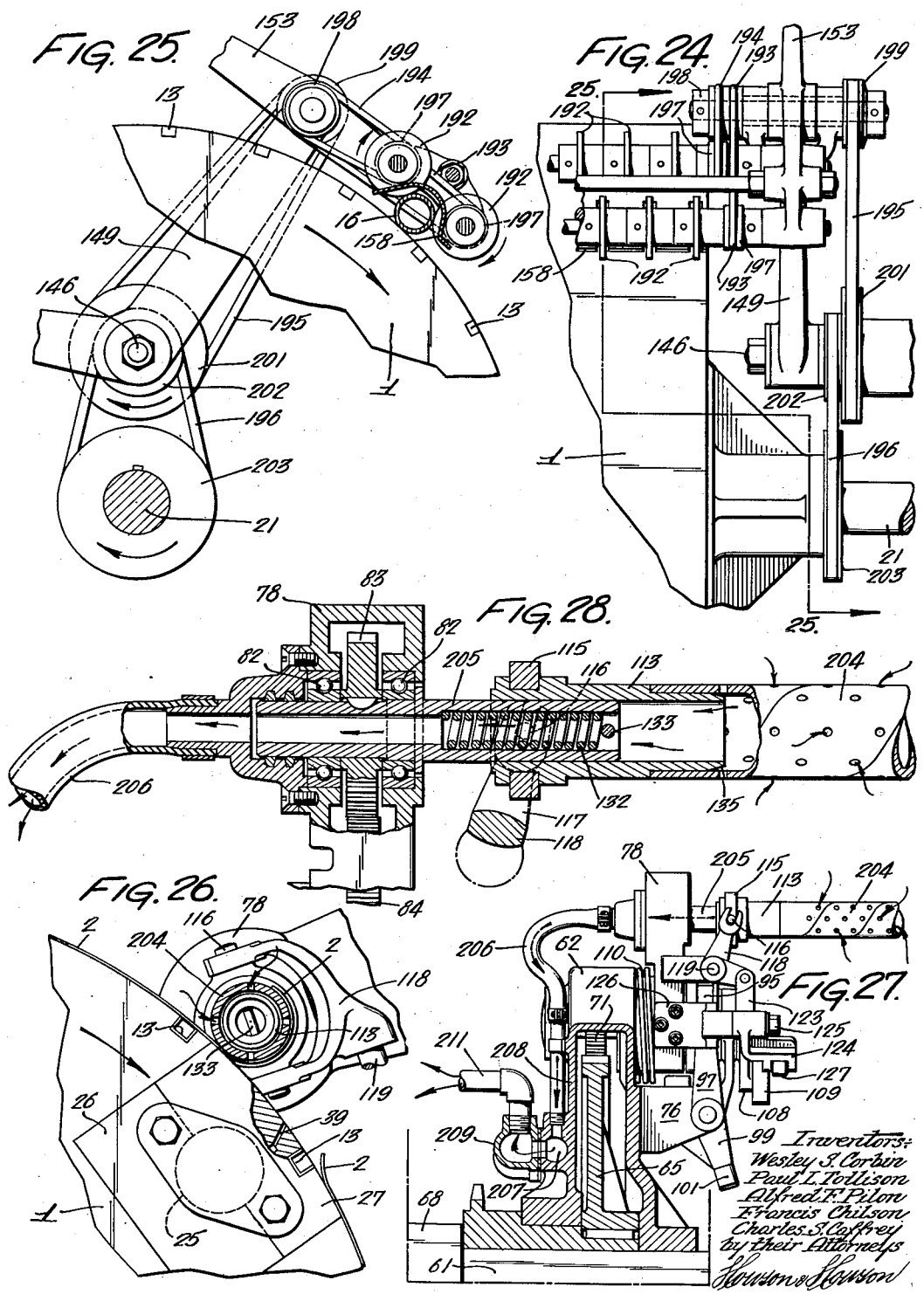

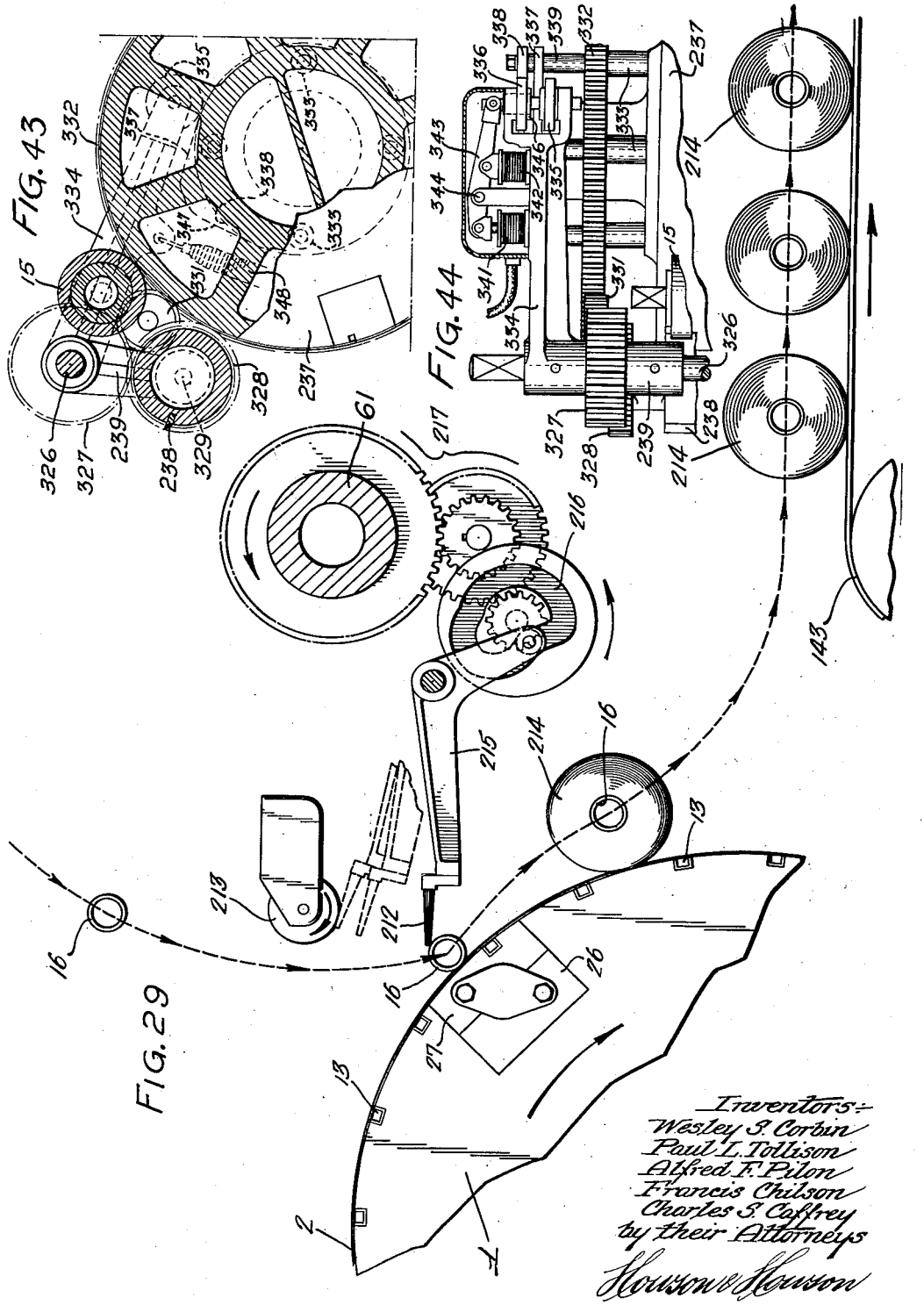

Sept. 25, 1945.                W. S. CORBIN ET AL                      2,385,692
                              CONTINUOUS WINDING MACHINE
                        Filed April 7, 1942          14 Sheets-Sheet 10
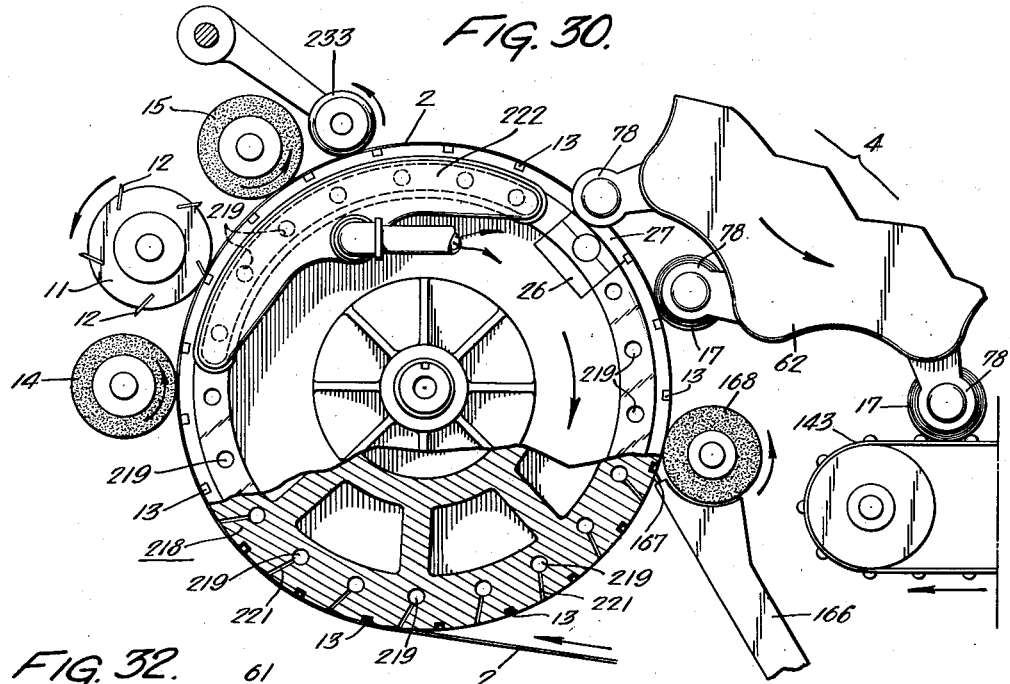
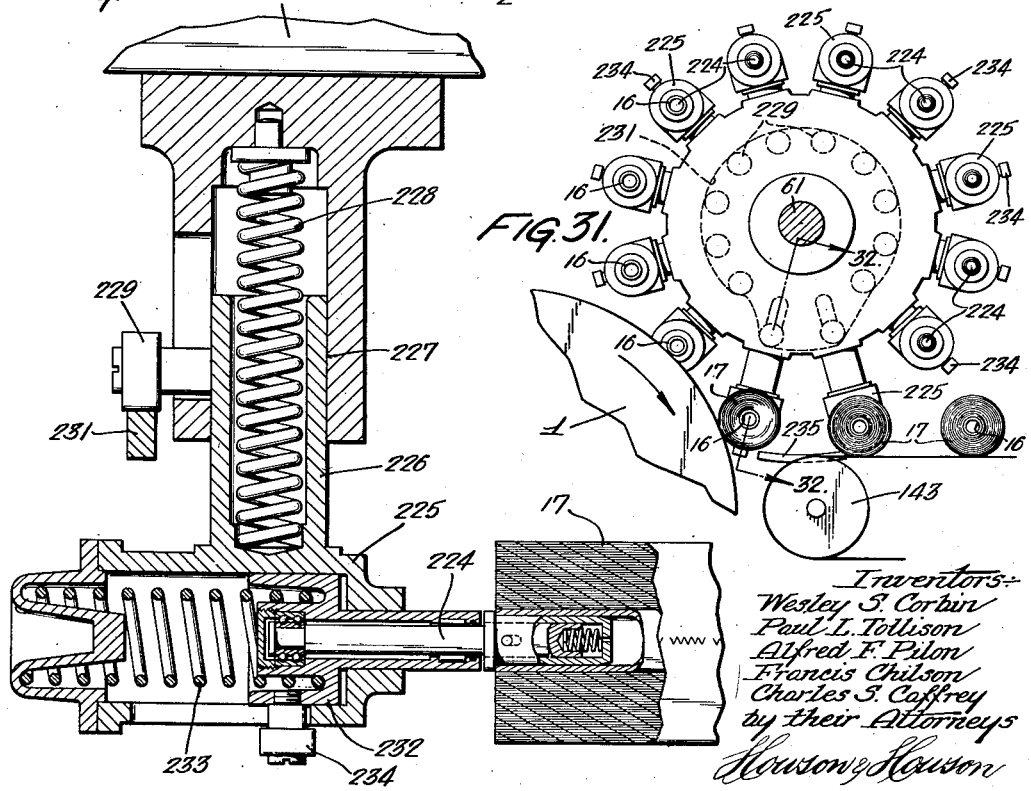

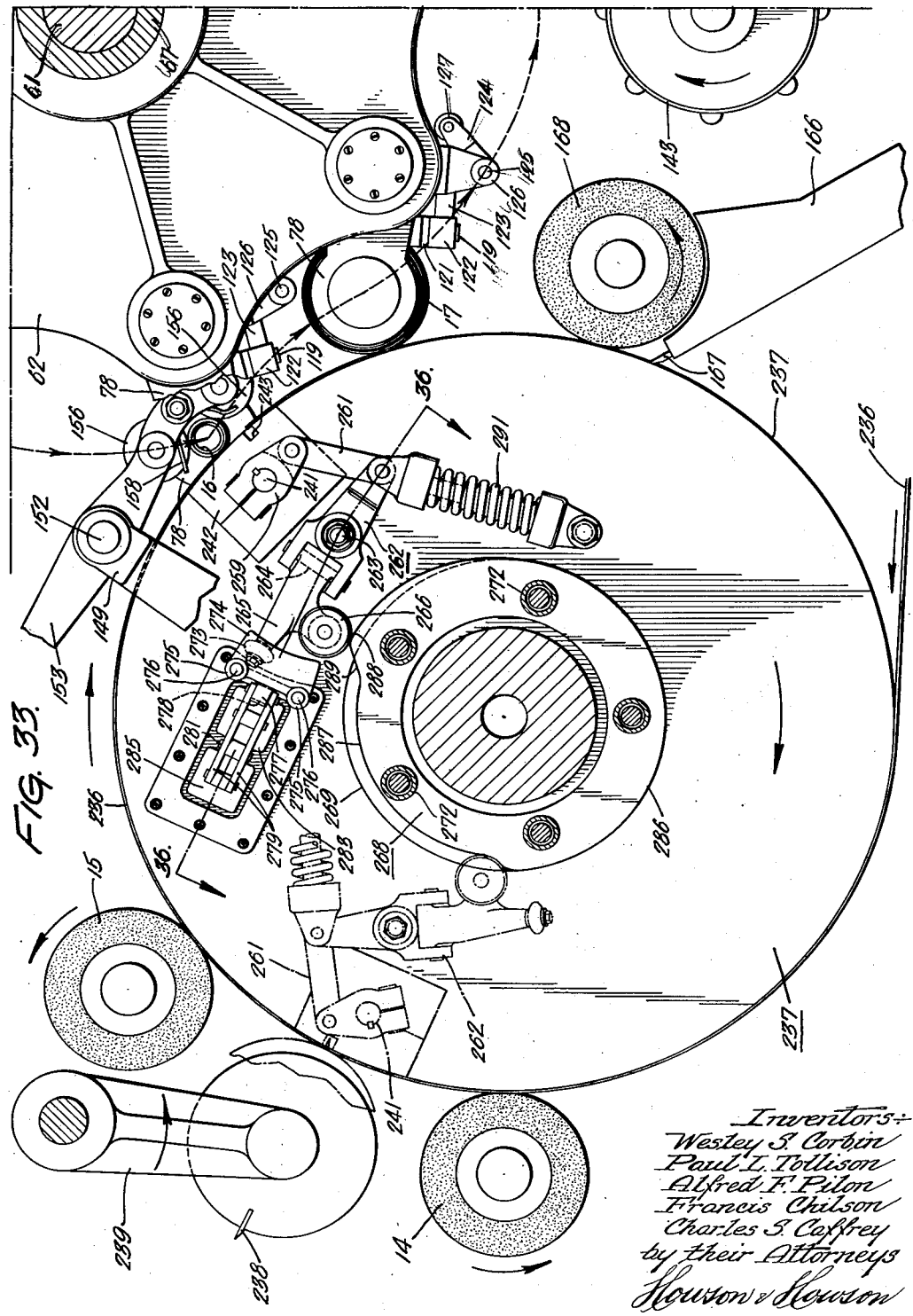

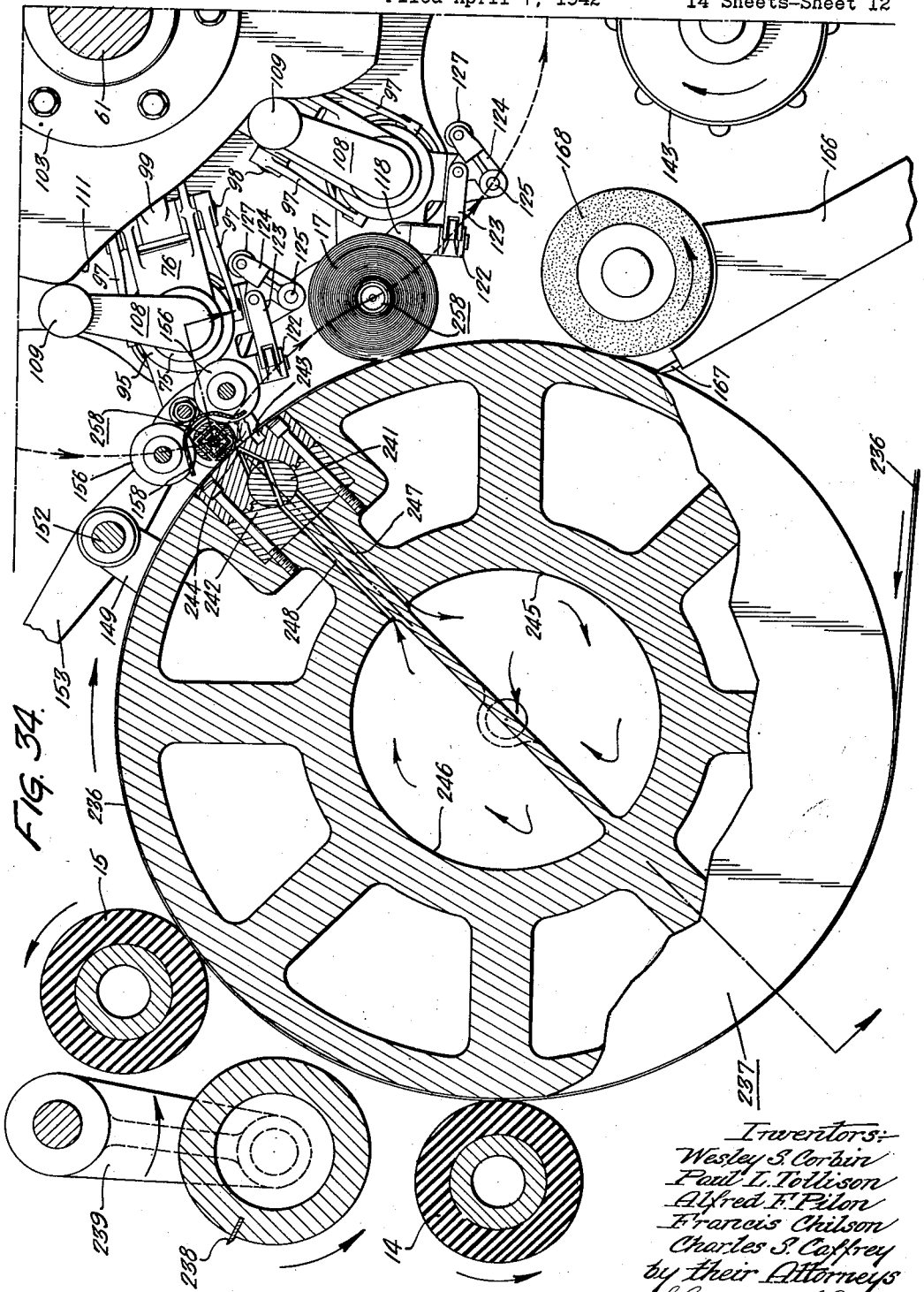

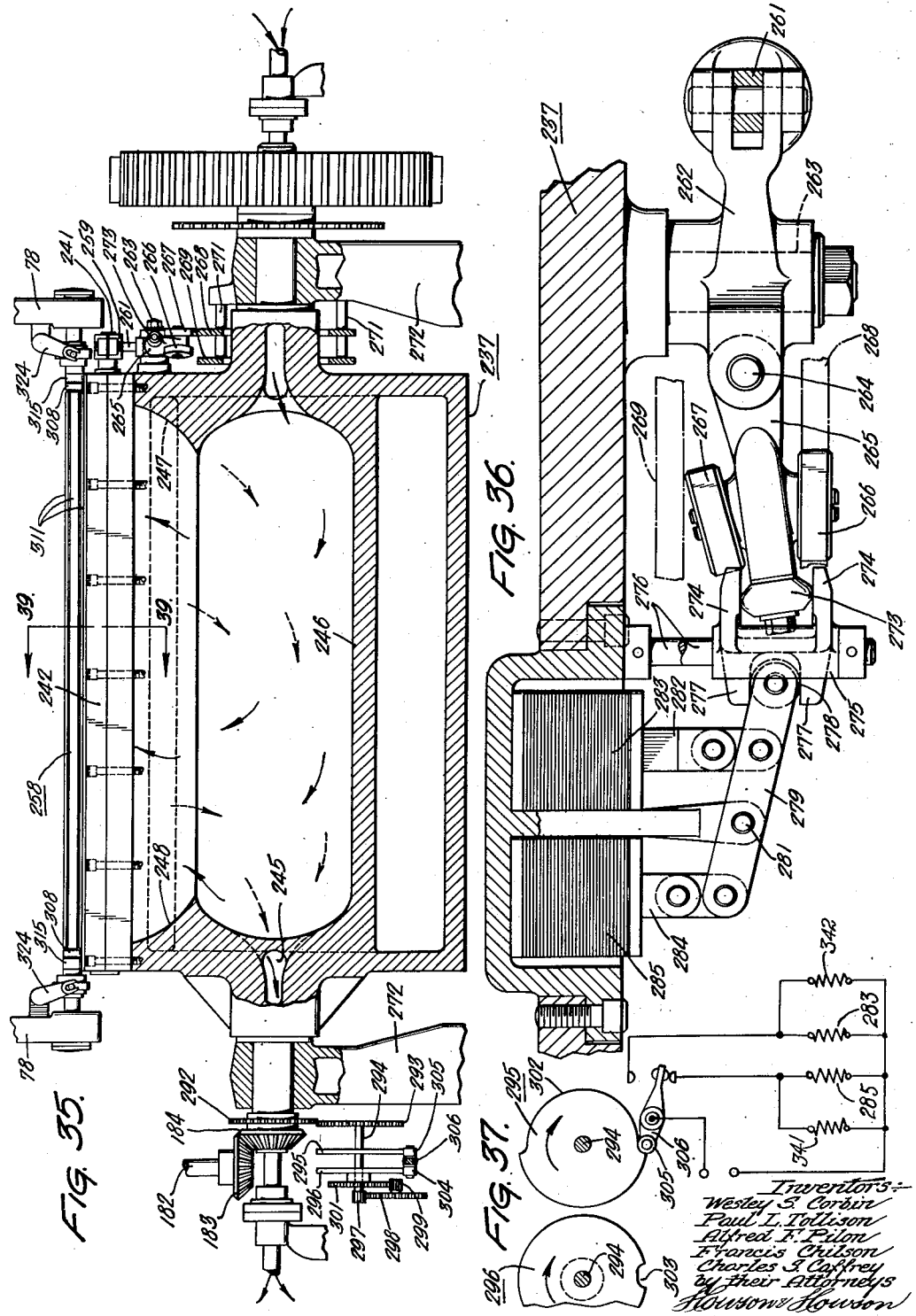

Sept. 25, 1945.  W. S. CORBIN ET AL  2,385,692
CONTINUOUS WINDING MACHINE
Filed April 7, 1942    14 Sheets-Sheet 14
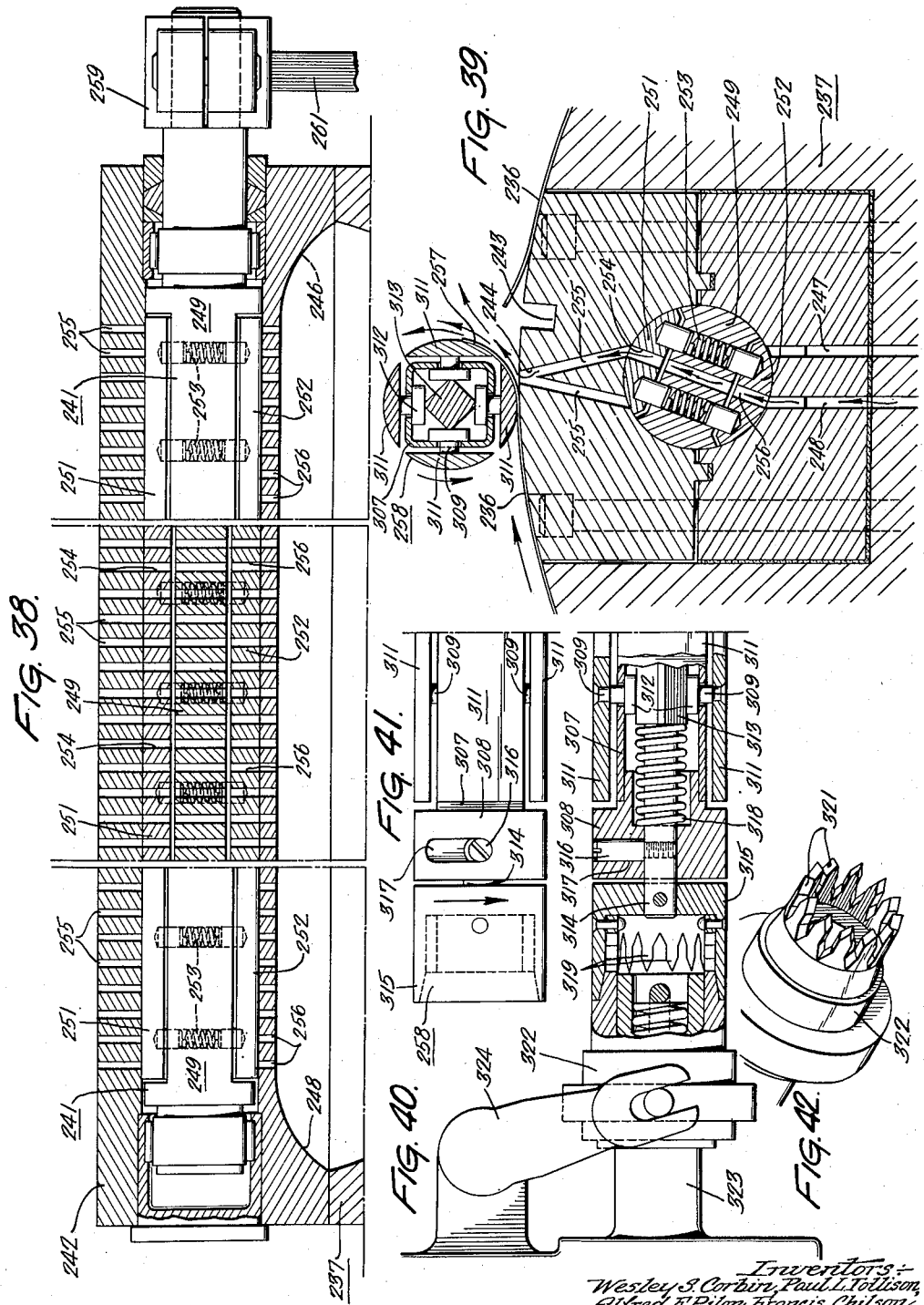

Patented Sept. 25, 1945

2,385,692

UNITED STATES PATENT OFFICE 2,385,692

CONTINUOUS WINDING MACHINE

Wesley S. Corbin, Ridley Park, Pa., Paul L. Tollison and Alfred F. Pilon, North Plainfield, N. J., Francis Chilson, Scarsdale, and Charles S. Caffrey, Port Washington, N. Y., assignors to Scott Paper Company, Chester, Pa., a corporation of Pennsylvania Application April 7, 1942, Serial No. 438,044

35 Claims. (Cl. 242—56)

This invention relates to improvements in winding machines, and more particularly to machines of the type adapted to convert a continuously traveling strip or web into a plurality of relatively small consumer rolls.

The principal object of the invention is to provide a machine of this type which shall be capable of operation at relatively high speeds and which shall, therefore, possess a relatively high productive capacity.

Another object of the invention is to provide in a machine of the stated type novel means for accurately regulating the diameter of the finished rolls, and for producing a roll product of uniform diameter irrespective (within practical limits) of the paper content of the roll.

Still another object of the invention is to provide a machine which shall be adapted in principle for producing rolls from perforated webs, such as toilet rolls for example, and also rolls from webs which are unperforated, such, for example, as waxed paper.

A further object of the invention is to provide a machine which shall be adapted in principle for winding the rolls upon a base core or, in the absence of a core, directly upon a suitable mandrel which may subsequently be withdrawn from the finished roll.

To these various primary ends, and others hereinafter appearing, the invention further contemplates the provision of certain novel structural and mechanical features and combinations hereinafter described and illustrated in the attached drawings, wherein:

Figure 1 is a diagrammatic side elevational view of a machine made in accordance with our invention;

Fig. 2 is a diagrammatic side elevational view of the feeding means from which the work material passes to the mechanism shown in Fig. 1;

Fig. 3 is an enlarged sectional view through the winding drum and the immediately associated parts as shown in Fig. 1;

Fig. 3a is a fragmentary view in perspective showing a detail of the winding drum shown in Fig. 3;

Fig. 4 is a section on the line 4—4, Fig. 1;

Fig. 5 is a section on the line 5—5, Fig. 4;

Fig. 6 is a section on the line 6—6, Fig. 5;

Fig. 7 is a fragmentary view from the line 7—7, Fig. 4;

Fig. 8 illustrates in perspective one of the elements of the valve mechanism associated with the winding drum;

Fig. 10 is a section on the line 10—10, Fig. 9;

Fig. 11 is a section on the line 11—11, Fig. 10;

Fig. 12 is a fragmentary view in perspective showing a detail of the mechanism shown in the immediately preceding figures;

Fig. 13 is a fragmentary sectional view showing a detail of the hopper feed;

Fig. 14 is a fragmentary sectional view illustrating the roll-caging mechanism;

Fig. 15 is a fragmentary sectional view showing elements of the mechanism shown in Fig. 14 in a different position of relative adjustment;

Fig. 16 is a section on the line 16—16, Fig. 14;

Fig. 17 is a fragmentary view in sectional perspective of the caging roll assembly;

Figure 9:
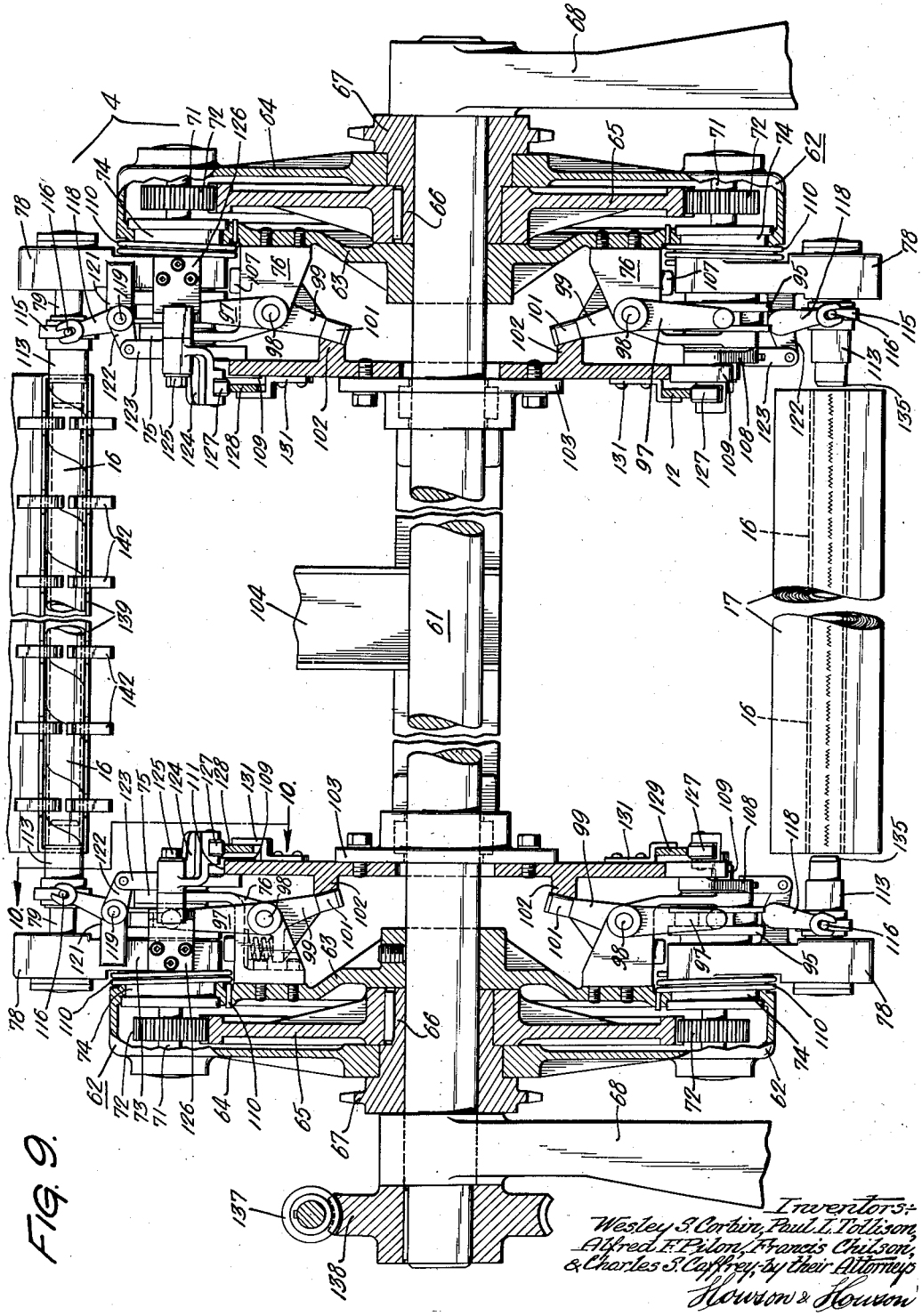
Fig. 9 is a section on the line 9—9, Fig. 1.

Figs. 18 to 21, inclusive, are fragmentary sectional views illustrating the mode of operation of the roll-caging device and also one of the safety devices;

Fig. 22 is a fragmentary sectional view showing a modification of the caging means;

Fig. 23 is a fragmentary elevational view of the mechanism shown in Fig. 22;

Fig. 24 is a fragmentary elevational view illustrating another modification of the caging mechanism;

Fig. 25 is a section on the line 25—25, Fig. 24;

Figs. 26, 27 and 28 are fragmentary sectional views illustrating a modification of the winding mechanism within the scope of the invention;

Fig. 29 is a diagrammatic sectional view illustrating another modification of the transfer mechanism;

Fig. 30 is a fragmentary sectional elevational view illustrating still another modification within the scope of the invention;

Fig. 31 is a sectional view illustrating a modification of the reel mechanism;

Fig. 32 is a section on the line 32—32, Fig. 31;

Fig. 33 is an enlarged fragmentary sectional elevational view illustrating another modification within the scope of the invention;

Fig. 34 is another fragmentary sectional view of the same modification;

Fig. 35 is a longitudinal sectional view of the drum and immediately associated parts shown in Figs. 33 and 34;

Fig. 36 is a section on the line 36—36, Fig. 33;

Fig. 37 is a diagrammatic sectional view illustrating a detail of the mechanism shown in Fig. 35;

Fig. 38 is a longitudinal sectional view of the valve device shown in Fig. 39;

Fig. 39 is a sectional view on the line 39—39, Fig. 35;

Fig. 40 is a fragmentary longitudinal sectional view showing details of the mandrel element shown in Fig. 39;

Fig. 41 is a fragmentary view showing one end of the mandrel;

Fig. 42 is a fragmentary view in perspective of one of the reel trunnion elements designed for coaction with the mandrel illustrated in Figs. 39, 40 and 41;

Fig. 43 is a fragmentary sectional view illustrating details of the device illustrated in Fig. 33, and Fig. 44 is a top plan view of the portion of the machine shown in Fig. 43.

With reference to Figs. 1 and 2 of the drawings, the machine comprises a drum which in operation rotates continuously and at a uniform rate of speed and to which the web or strip 2 of work material is guided by means, in the present instance, of an idler roll 3. The several operations upon the web 2, including the winding of the web into the finished rolls, are carried out against the drum 1 which thereby exercises a direct control over all of said operations. The cores or mandrels upon which the web is wound in producing the roll product are carried to the drum on a rotary reel 4, and means is provided, as hereinafter described, for parting the web from a finished roll and for transferring the free end of the web to a succeeding core or mandrel for a repetition of the winding operation, said means being operative without interruption or deceleration of the normal movement of the web on the drum.

In the present instance, the web 2 is withdrawn from a parent or mill roll 5, see Fig. 2, which is one of several rolls carried on a reel 6, means being provided in association with this reel, as indicated at 7, for connecting the trailing end of a depleted roll to the outer end of a fresh one so that the passage of the web to the winding machine may be continuous and uninterrupted. Means is provided in the present instance for driving the parent roll from which the web is being withdrawn at a rate of speed synchronized with the rotation of the drum 1 so as to maintain the web under a continuous and predetermined tension, said means consisting in the present instance of a driven belt or belts 8 which engage the periphery of the roll, the speed of the belts being varied through the medium of a speed-changing unit 9 with which the belt is operatively connected.

In the embodiment of the invention illustrated in Fig. 1, the web 2 in passing around the drum is subjected to the action of a perforating roll 11, said roll carrying blades 12 which in conjunction with a series of recesses 13 in the peripheral surface of the drum (see Fig. 3a) function in known manner to perforate the web along transverse lines uniformly spaced longitudinally of the web. In the present instance, rolls 14 and 15 are provided, one at each side of the perforating roll 11, these rolls operating against the web in a manner to aid the perforating operation. Preferably the roll 14 is driven at a slightly slower peripheral speed than the linear speed of the web so that it has a dragging action upon the latter which offsets a tendency of the perforating blades to drag the web downwardly into the recesses 13. The peripheral speed of the roll 15 is preferably somewhat higher than the linear speed of the web so that this roll tends to draw the web tightly across the recesses 13 during the perforating operation. These rolls are not tight against the paper and will overcome the drag of the knives as described without affecting the normal linear movement of the web 2 on the drum.

In a position beyond the roll 15, the reel 4 functions to bring a tubular core 16 against the web on the drum, and means is provided for starting the web around this core to initiate the winding operation. This starting of the web on the core and the parting of the web between the new core 16 and a previously wound and completed roll 17 is a function in part of a pneumatic device contained within the drum 1. As best shown in Figs. 3 to 8, inclusive, the drum 1 is hollow so as to provide at its center a chamber 18, and this chamber is connected through a passage 19, which extends through one of the trunnions 21 of the drum, and a pressure line 22 with a suitable source of pneumatic pressure (not shown). The chamber 18 is also connected through a series of ports 23 with a chamber 24 within which is mounted a rotary valve member 25. The chamber 24 is formed in the present instance in a housing member 26 which is set into a recess in the periphery of the drum 1, as shown in Figs. 3 and 4, the said housing member extending the full length of the drum, as shown in the latter figure. A complementary housing member 27 is also provided which overlies the member 26 and which with the latter member is secured in position by screws 28. The housing member 27 is formed interiorly to afford a seat for the cylindrical valve member 25, and this member is also supported at the ends, as indicated at 29, and also at the center, as shown at 31, upon the housing member 26. The valve member 25 is further supported in roller bearings 32 between the housing members 26 and 27, and one end of the valve element is extended through the end of the housing 26—27 so as to provide for connection therewith of an actuating lever 33 whereby the valve element may be actuated, as hereinafter described, in synchronism with the rotation of the drum 1.

The valve member 25 has a series of ports 34 which extend from the inner side thereof and from the chamber 24 to a longitudinal channel 35, this channel communicating with a longitudinal recess 36 in the periphery of the valve member. Within this recess 36 is seated an end-to-end series of segmental valve elements 37, the outer faces of which are contoured to fit accurately against the surface of the valve seat formed in the housing member 27. As shown in Fig. 8, the segmental elements 37 are provided each with a series of apertures 38 which communicate with the channel 35, and through the ports 34 with the chamber 24. The outer exposed face of the housing member 27 is curved to form, in effect, a continuation of the peripheral surface of the drum 1, and from this outer surface a narrow slot 39 extends inwardly at an angle to the radius of the drum, the inner end of this slot connecting with a series of ports 41 which extend to the valve seat in the interior surface of the housing member 27. When as shown in Fig. 5 the valve member 25 is in a certain position of adjustment, the inner ends of the ports 41 are covered by the elements 37 whereby the pressure of air in the chamber 24 acts to force the elements 37 outwardly against the valve seat and over the inner ends of the ports 41 so as to seal the later and to prevent the passage of air to the slot 39. When the valve member is adjusted to the right, as viewed in Fig. 5, to an extent bringing the apertures 38 of the elements 37 into alignment with the inner ends of the ports 41, the slot 39 is directly connected with the pressure chambers 24 and 18, with the result that the air is permitted to escape in a blast through the slot 39 and against the web 2 which normally overlies the slot.

The lever 33 is normally held by joint action of a spring 42 and a stop 43 in a position corresponding to that illustrated in Fig. 5, wherein the nozzle slot 39 is disconnected from the source of compressed air. The lever 33 carries at one end a cam roll 44 which is adapted for engagement with a cam 45 pivotally secured at 46 to the fixed structure of the machine. The cam 45 is operatively connected through a link 47 with a pivoted lever 48, and this lever in turn is operatively connected with a solenoid 49 which when energized tends to draw the proximate end of the lever downwardly so as to elevate the cam 45 into the path of the cam roller 44 on the lever 33. When the cam roller contacts the cam 45, the lever 33 is rocked to adjust the valve member 25 into a position in which compressed air is passed to the nozzle slot 39, as previously described.

The solenoid 49 is connected, see Fig. 4, in a circuit which includes a rotary switch device 51 operatively associated with the drum 1. In the present instance, one of the trunnions 21 of the drum is provided with an extension 52 which carries a worm 53, and this worm meshes with a worm wheel 54 on a shaft 55 suitably journaled in the frame of the machine. The shaft also carries a disk 56, the peripheral surface of which is insulated, as indicated at 57, with the exception of one point 58. Engaging the peripheral surface of the disk 56 is a contact element 59, and when the disk 56 has turned to an extent bringing the uninsulated point 58 into contact with the element 59, the electric circuit is completed and the solenoid 49 energized. At all other times during the rotation of the disk 56, the circuit is broken.

The rotation of the disk 56 is synchronized with that of the drum 1 so that elevation of the cam 45 as described above occurs after each predetermined number of revolutions of the drum. Since the cam 45 is relatively fixed, the actuation of the valve 25 to discharge air through the nozzle slot 39 will occur always in a predetermined position, as illustrated in Fig. 3. It will be noted that this position is so related to the core 16 and the previously wound roll 17 that the blast of air released through the nozzle slot 39 is imposed upon that portion of the web which lies between the said core 16 and the roll 17, and as a result of this blast the web is parted from the finished roll 17 and is started on the core 16 for the production of another roll, all in the manner hereinafter described. After the transfer is completed, the valve 25 is returned immediately to the closed position and remains closed until the next transfer operation occurs.

The reel 4 is best illustrated in Figs. 1 and 9 to 12, inclusive. It comprises a main shaft 61, to each end of which is secured a head member 62. Each of these heads comprises a flange 63 which is secured to the shaft and which has suitably connected to its outer periphery an inturned section 64. In the space between the flange 63 and the extension 64 is a gear wheel 65, this gear being keyed to a hub 66 of a sprocket 67 journaled on the shaft 61. It is to be noted that the said shaft 61 is journaled in members 68 which are parts of the fixed framework of the machine.

Supported in bearings 69, 69 in the peripheral portions of the flange 63 and the extension 64 is a series of shafts 71. These shafts, which in the present instance number eight, are uniformly spaced around the periphery of the flange 63, and each carries a pinion 72 which meshes with the gear 65. As shown in Fig. 11, each of the shafts 71 extends into a housing 73 which is rotatably supported at 74 in one end of the flange 63 and flange extension 64, and at the other end in a journal 75 formed on the outer end of a bracket 76 which is secured to the flange 63. The inner extremity of the shaft 71 is supported on an anti-friction bearing 77 in the housing 73. Each of the housings 73 has an arm-like extension 78, and each of these extensions carries a rotatable trunnion element 79. The trunnions on one of the heads extend toward and are aligned respectively with the trunnions on the other head, and the trunnions are adapted to support and to carry the aforesaid cores 16 to the drum for initiation of the successive winding operations, as hereinafter described.

Each of the trunnions 79 is carried on the end of a stub shaft 81 which is journaled in anti-friction bearings 82 in the extension 78. Each of the shafts 81 carries within the hollow extension 78 a gear 83 which meshes with a pinion 84 journaled on a pin 85 in said extension. The pinion 84 meshes in turn with a gear element 86 journaled on the shaft 71 within the housing 73. The gear 86 is slidably supported on a sleeve 87 which is secured to the shaft 71 and which has at one end a flange 88 which constitutes one element of a clutch, the other element being in the form of a disk 89 carried by the gear 86. Springs 91 tend to hold the disk 89 in an extended position from one end of the gear 86, as shown in Fig. 11, and the disk is anchored in the gear by means of pins 92 which are slidably supported in the gear and which have at their inner ends heads which limit the movement of the disk 89 under the action of the springs 91.

The gear 86 has a hub portion 93 which is connected by means of pins 94 with a member 95 slidably supported on the outside of the housing 73, and this member 95 has a circumferential recess 96 which is engaged by arms 97, 97 extending in spaced relation from a shaft 98 journaled in the bracket 76, said shaft having connected to the mid portion thereof an arm 99 by means of which the said shaft and with it the arms 97 may be oscillated so as to axially adjust the gear 86 on the sleeve 87 to an extent engaging or disengaging the clutch elements 88 and 89 as may be required. When the clutch is engaged, the trunnion 79 will be operatively connected with the sprocket 67 whereby rotation of the sprocket will result in a rotation of the trunnion.

It will be noted that the lever 99 carries at its extremity a roller 101 which engages a cam 102 concentric with the shaft 61 and held stationary through the medium of a collar 103 embracing the shaft 61 and connected to the fixed framework 104 of the machine. A spring 105 is confined between a bracket-like extension 106 of the arm 99 and a spring seat 107 in the bracket 76, and this spring 105 exerts resilient pressure to hold the roller 101 in engagement with the cam 102. Each of the housings 73 has an arm 108 secured to the inner end thereof, which arm carries a cam roller 109 arranged for engagement with a cam 111, this cam being made integral in the present instance with the cam 102, and being like the latter immovably connected to the fixed framework of the machine. Connected to the housing is a coiled spring 110 which acts to hold the roller 109 against the cam 111. Through the cam 111 and the arm 108, the housings 73 are oscillated for a purpose hereinafter described.

With reference again to Fig. 11, it will be noted that each of the trunnions 79 comprises a hollow cylindrical body member 112 upon which is slidably supported a sleeve 113. The inner end of this sleeve is provided with a circumferential recess 114 for reception of a loose collar 115, this collar having trunnions 116 at opposite sides thereof. The trunnions 116 are engaged respectively in the bifurcations 117, 117 of a lever 118, said lever having a pin 119 at one end which is pivotally held in a journal boss 121 on the housing extension 78. The pin 119 has attached to its outer end an arm 122, and this arm is connected by a link 123 with a lever 124 which is pivotally mounted at 125 on a bracket 126 secured to the housing 73. The lever 124 has a roller 127 at its outer end which is adapted for engagement with each of two cams 128 and 129, which cams are attached through the medium of brackets 131 to the fixed structure of the cams 102 and 111. By action of the roller 127 on the cams 128 and 129, the lever 118 is moved so as to shift the sleeve 113 axially on the member 112, the retractive movement of the sleeve 113 being in opposition to a spring 132 which is housed within the hollow member 112. As shown in Fig. 11, this spring bears against a pin 133 the ends of which are secured in the sleeve 113 and which passes through a slot 134 in the wall of the member 112. Also as shown in Fig. 11, the outer end of the sleeve 113 is beveled at 135, and the outer end portion of the sleeve is also of slightly reduced diameter adapted to fit neatly within the open ends of the hollow core 16 and having at its inner end a shoulder which in operation bears against the end of the core. When the sleeves 113 of the companion pairs are retracted on the base members 112, one of the cores 16 may be inserted between the proximate ends of the said sleeves, so that when the sleeves are again advanced, they will enter the respective ends of the cores 16, as shown in Fig. 11. Subsequent retraction of the sleeves will release the core from the reel. It is preferred to form the ends of the sleeves as shown in Fig. 12 with axially extending and relatively spaced ribs 136.

As shown in Fig. 9, the shaft 61 receives its rotation from a worm 137 which meshes with a worm wheel 138 at one end of the shaft. Rotation of the shaft effects a rotation of the reel as a whole. In this movement, the cores 16, which are fed to the trunnions 79 as hereinafter described, are carried toward the drum 1 and against the web 2 upon the drum, whereupon the transfer of the web to the core is made as previously described. Subsequently and during the winding operation the reel advances the core and the roll forming thereon, as illustrated in Fig. 1. During this advance movement, the core is gradually retracted from the drum surface in order to compensate for the ever increasing diameter of the roll. This retractive movement is positively controlled by the cam 111, which is shaped as illustrated in Fig. 1, so that the finished roll will have a predetermined diameter. In other words, the cam 111 will regulate the diameter of the roll and also its density, and by predeterminedly shaping the cam, a desired final roll diameter may be obtained. It will be noted that the device provides for a positive positioning of the axis of the roll with respect to the surface of the drum during the winding operation, the said axis gradually withdrawing from the surface of the drum as the winding operation progresses, and this retraction being controlled in a positive manner by the shape of the cam. In this operation the traverse movement of the roll support is effected by means exclusive of the roll, the build up of the roll having no effect upon the position of the axis at any time during the winding operation.

With further reference to Fig. 1 and to Fig. 13, it is to be noted that the aligned pairs of the trunnions 79 in their movement with the reel are brought into position at opposite sides of the discharge end 139 of a hopper 141, which hopper contains the cores 16. The discharge end 139 is formed so that the cores move successively to a discharge position wherein the ends are exposed. Resilient arms 142 on the hopper retain the most advanced core of the series in this position as shown in Fig. 13, and the arms may be flexed outwardly to permit withdrawal of the core. This withdrawal is effected by the movement of the reel after the trunnion sleeves 113 have been projected into the opposite ends of the core. As previously described, the sleeves 113 are retracted by the cams 128 and 129, and when the roller 127 of the retracting device leaves either one of these cams, the trunnion sleeves are sharply projected outwardly by the springs 134. This projection of the sleeves occurs when they are in alignment with the leading core 16 at the discharge end of the hopper 141, whereupon as the rotation of the reel continues, the core is withdrawn between the flexible retaining arms 142. The retraction of the sleeves 113 by the cam 129 is for the purpose of releasing the core and the finished roll 17 which has been wound thereon from the reel, this release occurring at a moment when the rolls carried by the reel are in position above a conveyer 143, which conveyer then receives the released roll and carries it from the machine.

The cam 102 functions to engage the clutch 88—89 at a point in the cycle subsequent to the pickup of one of the cores, as described above, and before the core meets the web on the drum. This engagement of the clutch results in a rotation of the core at a peripheral speed at least as great as and preferably somewhat greater than the linear speed of the web on the drum. The clutch remains in engagement during the winding operation, and is again disengaged prior to the release of the finished roll from the reel onto the conveyer 143, as previously described. It is to be noted that the angular speed of the roll forming on the core decreases as the roll grows in diameter, and this decrease in angular speed is provided for by a relative slipping of the clutch elements 88 and 89 which are built for such slippage.

In Figs. 3 and 14 to 19, inclusive, we have illustrated a means forming an element of the invention for caging the cores 16 during the transfer of the web to the core and during the early part of the winding operation. This caging means, which in one form comprises rollers which engage and confine the core and the roll against the drum, functions as hereinafter described in the transfer operation, another of its important functions being to support the core which is inherently flexible during the transfer and in the early part of the winding operation so as to prevent vibratory or deformative movements in the core which might interfere with the transfer and winding operations. After the winding operation has progressed to a point where the core carries sufficient paper to give it the required degree of rigidity, the caging means can be and is withdrawn in preparation for a further cycle of operations on the incoming cores.

Opposite each end of the drum 1 is a gear 144 having in one face thereof a cam groove 145. On each of the journals 148 of the drum 1, see Fig. 4, is a lever 149, these levers being operatively connected with the cam 145 through the medium of a roller 151 which projects from one end of the lever into the cam groove 145, as best shown in Fig. 14. The other ends of the levers are connected by a shaft 152 which extends over and in parallel relation to the drum 1. Connected to each end of the shaft 152 is an arm 153, and the forward ends of these arms 153 are connected by a tie rod 154. Supported in the forward ends of the arms 153 and extending between the latter at opposite sides respectively of the tie rod 154 are shafts 155, 155, and mounted for rotation on each of these shafts is a series of disk-like rollers 156, the disks themselves being spaced apart by their extended hub portions 157, as illustrated. Also secured at its opposite ends to and supported by the forward ends of the arms 153 is a curved baffle 158, this baffle underlying the tie rod 154 and the shafts 155 and having in each of the opposite longitudinal sides thereof a series of slots 159 for accommodation of the disks 156. As shown in Fig. 14, the disks 156 are adapted to engage and to confine the cores 16 against the drum and upon the web 2 traveling on the drum, and when the rollers thus engage the core, the baffle 158 overlies the core in spaced relation to the surface of the latter.

Each of the arms 153 carries at its rear end a roller 161 which is adapted for engagement with a relatively fixed cam 162. This cam carries a pivoted dog 163 which normally and by gravity assumes the position in which it is shown in Fig. 14, resting against a stop 160, the lower surface of the dog when in this position forming a continuation of the rear end 164 of the cam surface. If, therefore, the roller 161 is in engagement with the cam surface 164 and is moving in the direction of the arrow in Fig. 14, the dog 163 will cause the roller and the rear end of the arm 153 to be deflected downwardly, as indicated in broken lines in Fig. 14, thereby elevating the forward end of the arm 153 to the dotted line position as illustrated. As the roller clears the forward depending end of the dog 163, the arm 153 is permitted, by reason of the predominant weight of the parts at the forward end thereof to move into the solid line position shown in Fig. 14, in which position the disks or rollers 156 come into engagement with the surface of one of the cores 16 which has been advanced on the reel to a position against the web 2 on the drum 1. It will be noted that in the absence of the core 16, the roller 161 will engage the forward end of the working surface of the cam 162, which latter thereby acts as a stop to limit the downward movement of the forward ends of the arms 153 toward the drum. When the cam 145 acts to move the levers 149 in the opposite direction, the rollers 161 on the arms 153 will engage the forward end of the dog 163 and will elevate the dog, as illustrated in Fig. 15, so as to permit the lever, the arms 153 and the associated parts to move to a retracted position withdrawn from the path of the cores 16 on the reel approaching the drum.

The operation of this device is as follows: As one of the cores 16 is carried on the reel into engagement with the web 2 on the drum, the cam 145 acts to rapidly advance the caging rolls 156 to the position shown in Fig. 14, wherein they act to confine the core as described against the drum. The levers 149 continue their forward movement under action of the cams 145 in timed relation with the movement of the reel so that the caging rolls maintain their position with respect to the core. When the parts reach a position as shown in Figs. 3 and 18 wherein the nozzle 39 lies slightly in advance of the core in the direction of its movement on the reel, the valve is actuated to connect the nozzle with the pressure chamber 18 previously described, with the result that the web 2 is either broken by the pressure of the air or is forced upwardly into the nip between the forward set of caging rolls 155 and the core, with the result that the web is broken by the pull at said nip. In either event, the air blast from the nozzle forces the web or the free end thereof upwardly around the forward end of the core, as shown in Fig. 18, the baffle 158 acting to direct the air and the web around the core so as to start the winding operation upon the latter. The winding operation now continues to a point shown in Fig. 19, with the caging rolls 156 maintaining their pressure relation upon the roll, and at this point the cam 145 acts to retract the lever 149 and the caging rolls. The roll under formation now carries sufficient paper to give it the required strength and rigidity and the caging rolls are no longer needed.

With reference to Figs. 1, 20 and 21, it will be noted that a bin 166 has been provided below the reel 4 and in proximity to the surface of the drum, said bin having at the open top thereof a doctor blade 167 which engages the periphery of the drum. Also at the upper open end of the bin is a wheel 168 which frictionally engages the drum. If for any reason the transfer of the web from a wound roll to a succeeding core is not accomplished so that the unbroken web continues to feed around the drum, the bin 166 is adapted to receive the web until such time as the transfer has been effected. Under circumstances such as described above, the unbroken web 2 has a tendency to adhere to the surface of the drum 1, so that a loop 169 is formed between the surface of the drum and the previously wound roll 171 to which the web is still attached. This loop is eventually caught in the nip of the roll 168 with the drum 1, with the result that the web is parted from the roll 171, as indicated in Fig. 21, the loop 169 being fed by action of the roll 168 and the doctor blade 167 into the bin 166. A suitable nozzle 172 is provided at the top of the bin which by projection of a fluid downwardly into the top of the bin prevents the web from accumulating at the mouth of the bin and maintains a constant flow or passage of the web into the latter.

Referring to Fig. 1, it will be noted that the drum 1 is driven at a constant angular velocity from a motor 173 through a chain belt 174. The drum shaft carries a sprocket 175 which is connected through a chain 176 to the variable speed unit 9. The worm 137 which drives the reel 4 is carried on a shaft 177 which is connected through a gear unit 178 and bevel gears 179 and 181 to a shaft 182, this shaft being connected by bevel gears 183 and 184 with the drum shaft 185.

The gear unit 178 may be adjusted through the medium of a handle 186 to change the ratio of the speeds between the drum and the reel 4 for the purpose of changing the length of the web which is wound on the cores to form the finished roll. While this provides for change in the length of the web included in the finished rolls, it does not, if the cam 111 is retained, change the diameter of the finished product. Thus, the rolls containing the greater length of web will differ from the rolls of lesser paper content in the density of the roll, but not as to diameter. It is to be noted that a change in the speed of the reel 4 for the purpose set forth must be accompanied by an adjustment of the speed ratio between the drum 1 and the disk 56 which by coaction with the contact element 59 controls the intervals at which the valve 25 operates to interrupt one winding operation and to initiate another, as described above. This adjustment can be made by changing the worm 53 and the worm wheel 54.

Actuation of the trunnion spindles 79 is effected as previously described through gears 65 and sprockets 67. These sprockets may be connected with the motor 173 by any suitable means, such as the transmission indicated generally at 187 in Fig. 1.

The operation of the mechanism insofar as described will be clear from the foregoing description. The web 2 passing to the drum 1 is first perforated, and is then wound in successive operations upon the cores 16 to produce the finished roll product 17. The cores are picked up by the reel from the hopper 141 and are carried successively to the drum and against the web on the drum, and are confined by the caging rolls 156 during the transfer operation. This transfer operation is effected by means of the air blast controlled by the valve 25 in conjunction with the caging rolls and the guide baffle 158 associated with the latter. As previously stated, the actual parting of the web to separate it from a finished roll and to provide for the winding of the web upon the succeeding core may be effected in one of two ways, depending in part upon the pressure and character of the pneumatic discharge and upon the timing of the valve. Thus the air may be made to carry the web without rupture and in the form of a loop up into the nip of the forward caging roll and the core 16, which has the effect of initiating the winding of the web upon the core before the web is actually parted from the succeeding finished roll. The pneumatic means may also be regulated so that the blast of air is sufficient in itself to rupture the web at a point between the new core and the completed roll, the air in conjunction with the guide baffle 158 carrying the free end of the web around the core to initiate the winding operation. The caging means operates as described to confine the successive cores as they are carried to the drum, and maintain their caging function until the windings have increased to a point where the roll is substantially rigid. It is then retracted sharply so as to clear the path of the succeeeding core in its movement to the roll, and is immediately advanced so as to confine that core against the roll preparatory to the transfer operation. The core-carrying trunnion elements 79 are actuated first to pick up the core from the hopper 141, and subsequently to release the finished roll to the conveyer 143. The speed of the drum and of the web 2 is constant throughout, and the speed of rotation of the reel and the timing of the valve may be varied to regulate the paper content of the finished rolls. It will be noted that all operations on the paper, including the perforating, the transfer of the web to the cores, and the winding operations on the cores are carried out against the drum 1, which affords an exact control permitting the operation of the machine at high speed and insuring a finished product accurately measured as to paper content and to diametrical size.

In Figs. 22 and 23, we have illustrated a modification of the caging means within the scope of the invention. In this case, the caging rolls 156 are replaced by a series of belts 188 which operate on rolls 189, 189 on the arm 191, this latter arm corresponding to the arm 153 of the embodiment previously described. The lever 149 remains the same as in the previous embodiment, and is, therefore, identified by the same reference numeral. In this case, the belts 188 function to confine the core 16 rotatably against the drum 1 in the manner shown in Fig. 22.

In Figs. 24 and 25 another modification of the caging means is shown. In this instance, the caging means comprises caging rolls 192, 192 of the same character as the rolls 156 previously described, but in this case provision is made by way of belts 193, 194, 195 and 196 and pulleys 197, 198, 199, 201, 202 and 203 for positively driving the caging rolls 192 in timed relation with the rotation of the drum 1. The pulley 203 is mounted on one of the drum trunnions 21; the pulleys 201 and 202 upon the pivot pin 146 of the lever 149; the pulleys 198 and 199 upon the shaft 152 at the end of the lever 149; and the pulleys 197, 197 on the shafts of the respective caging rolls 192.

In Figs. 26, 27 and 28, we have illustrated a modification of the transfer means, this means involving the use of perforated cores 204 as illustrated. In this case, the core-carrying trunnions 205, which correspond with the trunnions 79 of the previously described embodiment, are made hollow throughout, and each has connected therewith a flexible tube 206 which extends to a chamber 207 in the flange extension 208 of the reel head. An annular series of chambers 207 is provided in the flange extension 208, one for each of the pairs of core-supporting trunnions. The chamber 207 opens to the outer face of the extension 208, and seating against this face is a relatively fixed manifold member 209 which is connected through a duct 211 with a suitable source of suction (not shown). As the reel rotates, the chambers 207 are brought successively into communication with the manifold 209, whereupon suction is imposed upon the said chamber and through the duct 206 to the perforated core 204. This suction is imposed at the moment when the pneumatic valve 25 is opened for the transfer operation, so that the blast of air thus released against the web 2 ruptures the web and throws the free end against the perforated core 204, where it is held by suction operating through the perforations 204 for initiation of the winding operation.

A further modification showing a means for effecting a so-called "wet" transfer of the web to the core 16 is illustrated in Fig. 29. In this case, an applicator brush 212 is moved between a water-carrying roll 213 and a position, shown in full lines in Fig. 29, in which it engages the surface of the cores 16 as the latter move into engagement with the web 2 on the drum 1. The moisture thus applied to the surface of the core retains the free end of the web after the latter is parted from the finished roll 214, and thus initiates the winding operation upon the core. The brush 212 is carried on a bell crank lever 215, and this lever is oscillated through the medium of a cam 216 and cam-actuating gears 217, as illustrated.

The modification shown in Fig. 30 provides for longitudinally slitting as well as perforating the web preparatory to the winding operation. In this case, the drum 218 is provided with a plurality of longitudinal chambers 219, each of which has a slotted port 221 extending to the peripheral surface of the drum. As the drum rotates, the terminal ends of the chambers 219 are brought into communication with a suction manifold 222 which is relatively stationary, so that suction is imposed through the chambers 219 upon the longitudinal slots 221. Means is provided in the form of a series of slitter disks 233, which work against the peripheral surface of the drum as a platen, for longitudinally slitting the web 2, and the suction acting through the slots 221 as described retains the slitted sections of the web securely in place upon the surface of the drum preparatory to the transfer operation, which may be accomplished in any of the several ways previously described.

In Fig. 32, we have illustrated a modification in the construction and mode of operation of the reel, and more particularly in the manner in which the cooperating pairs of core-supporting trunnions are supported on the reel and are moved radially with respect to the surface of the drum 1. Each of the trunnion elements 224, corresponding to the elements 79 of the previously described embodiment, is carried in this instance upon a member 225, the member having a hollow cylindrical stem 226 which is slidably supported in a guide 227 on the reel body. A spring 228 is confined between the member 225 and the reel body and exerts resilient pressure tending to hold the member 225 and its stem 226 in an extended position, as illustrated. The spring 228 also holds a cam roller 229 on the stem 226 against a cam 231, said cam operating to radially move the member 225 with respect to the reel body, as hereinafter described. The trunnion 224 is journaled in a plunger 232 which is slidably supported in the cylindrical interior of the member 225 and which is urged by a spring 233 into the extended position in which it is shown in Fig. 32. The plunger 232 and the trunnion 224 may be retracted against the pressure of the spring 233 through the medium of a cam roller 234 which engages a cam 235 located in the path of the said roller. It is believed that the operation of this embodiment of the invention will be clear from the foregoing description.

The embodiment of our invention illustrated in Figs. 33 to 42, inclusive, is adapted primarily for winding consumer rolls from a traveling web of paper or the like which is not perforated and which may be of a relatively heavy type, such as waxed papers. In this case, a web 236 is carried around a drum 237 in the manner previously described, and means is provided in the form of a rotary knife 238 for cutting the web into the required lengths for the production of the finished consumer rolls. The rotary blade 238 is mounted on an arm 239, which by suitable means, hereinafter described, is moved to and from the drum in timed relation with the rotation of the latter so as to sever the web, the manner in which this severing operation takes place being substantially the same as that in which the perforations were made in the previously described embodiment. The drum carries a valve 241 which is arranged in definite relation to the position on the drum at which the severing action occurs, the valve housing 242 being provided in this instance with an axial recess 243 which coacts in known manner with the rotary blade 238 in the severing operation. It will be noted that this recess 243 is slightly in advance or ahead of the valve port 244 in the direction of the drum rotation, so that said port is covered by the free leading edge of the web when the severing action occurs. This is best shown in broken lines in Fig. 33.

The interior of the drum is provided in this instance with two chambers 245 and 246 respectively, the chamber 245 being connected with a source of suction, and the chamber 246 with a source of pressure air. The port 247 connects the chamber 245 with the chamber of the valve 241, and a corresponding port 248 similarly connects the said valve chamber with the pressure chamber 246. The port 244 and the valve 241 are formed so that in one position of the valve, the port 244 is connected, as shown in Fig. 34, with the passage 248 and the chamber 246, whereby pressure air may pass through the valve 244 to the under side of the web 236 on the drum. In an alternate position of the valve, the port 244 is connected, through the passage 247, with the suction chamber 245, and in this setting of the valve, the web 236 on the drum is subjected through the port 244 to suction. At the time that the web is cut, the valve has been adjusted to connect the port 244 with the suction chamber 245, and this suction, therefore, acts to hold the free leading end of the web against the drum during the period that this end is advancing to the transfer position. At the transfer position, the valve 241 is adjusted to the position connecting the port 244 with the pressure chamber 246, with the result that pressure air operating against the free end of the web directs that end upwardly around the core or mandrel upon which the winding operation is to take place, thus effecting the transfer.

The form of the valve is best shown in Figs. 38 and 39, wherein it will be noted that the cylindrical valve body is composed in effect of three parts, a central portion 249 and segmental portions 251 and 252. The segmental portions are held resiliently against the cylindrical wall of the valve chamber by means of springs 253. The parts 249, 251 and 252 have a longitudinal series of communicating ports, the ports 254 of the part 251 being adapted to register with one or other branches 255, 255 of the port 244, depending upon the position of adjustment of the valve. The ports 256 of the portion 252 of the valve are similarly adapted to register with the ports 247 and 248 which extend to the chambers 245 and 246, as previously described. In Fig. 39, the valve is adjusted to a position connecting the pressure chamber 246 with the port 244, and it will be noted that in this position the pressure air passing through the port 244 has thrown the leading end 257 of the web 236 upwardly about a mandrel 258 upon which the web is to be wound in producing the finished roll. In another position of the valve 241, the port 244 will be connected with the suction chamber 245, as described; and in an intermediate position the valve 241 will be in a position wherein the port 244 is disconnected from each of the chambers 245 and 246.

The means for actuating the valve is best shown in Figs. 33, 35, 36 and 37. Secured to one end of the valve which projects beyond the valve housing is an arm 259. This arm is connected through a link 261 with a lever 262, the lever being pivotally attached at 263 to the drum. The other end of the lever 262 is bifurcated, and a pin 264 extends between the bifurcations and forms a pivot for an arm-like extension 265. This extension carries two rollers 266, 267 which are adapted respectively to engage cams 268 and 269, which cams as shown in Fig. 35 are supported in the present instance on rods 271 extending from one of the journal supports 272 of the drum 237. The outer end of the pivoted extension 265 carries a roller 273 which occupies a position between forks 274, 274 on a sleeve 275, 275, this sleeve being slidably supported on pins 276, 276 which project from the end of the drum 237. The sleeve also has a fork 277, 277 which receives a roller 278 at one end of a lever 279, this lever being pivotally attached at 281 to the drum. Between the pivot 281 and the roller 278 the lever is suitably attached to the plunger 282 of a solenoid 283; and the outer free end of the lever 279 at the other side of the pivot 281 is similarly connected to the plunger 284 of a solenoid 285.

When the last-named solenoid is energized, the plunger 284 is drawn upwardly, as viewed in Fig. 36, the solenoid 283 being now deenergized, with the result that the sleeve 275, 275 is moved outwardly on its pins 276, 276, as illustrated, swinging the extension 265 to the position shown wherein the roller 266 is in engagement with the cam 268. The lever 262 is now under control of the cam 268 and may be oscillated by the latter around the pin 263, such oscillation resulting in an angular movement of the valve 241. When the solenoid 283 is energized to the exclusion of the solenoid 285, the lever 279 is oscillated to the opposite phase in which the sleeve 275, 275 is shifted inwardly on the pins 276, 276 to thereby swing the extension 265 into a position wherein the roller 266 is cleared from the cam 268 and the roller 267 is brought into operative relation with respect to the cam 269. The valve 241 is now under control of the cam 269.

It will be noted by reference to Fig. 33 that the periphery of the cam 269 is circular in form and concentric with the rotary axis of the drum 237. The cam 268 on the other hand has a portion 286 of its periphery, embracing approximately 180° of the latter, of a radius corresponding to the radius of the cam 269, the remaining 180° of the periphery being divided between a portion 287 of relatively small diameter and a portion 288 of relatively great diameter, the latter portion merging at one end into the portion 286 and being connected at the other end to the portion 287 by an inclined portion 289. Assuming that the parts are in the position shown in Figs. 33 and 36 and that the roller 266 is at the high point of the portion 288 of the cam 268, the valve 241 will be in the position in which it is shown in Fig. 39, and in this position the port 244 is connected to the pressure chamber 246 in the drum. As the drum rotation continues, the roller 266 passing down the portion 288 moves gradually closer to the axis of the drum until when it meets the portion 286 the valve will have been moved to a neutral position wherein the port 254, see Fig. 39, will lie intermediate the branches 255 of the port 244. In this neutral position of the valve, the port 244 is disconnected both from the pressure chamber 246 and the suction chamber 245. This neutral position of the valve continues until the roller moves into the portion 287 of the cam 268 of reduced radius, and at this time the valve is moved to a position in which the port 244 is connected to the suction chamber 245, this condition continuing until the roller riding up the inclined section 289 passes again to the apex of the elevated portion 288. It will be noted that a spring 291 is provided in association with the lever 262 to resiliently urge the lever in a counterclockwise direction, as viewed in Fig. 33, to thereby hold the rollers 266 and 267 against their respective cams.

When the roller 266 is in engagement with the portion 286 of the cam 268, the valve is in the neutral position as described above, and this also maintains when, the lever extension 265 having been shifted to the opposite phase, the roller 267 engages the cam 269. This shifting of the extension 265 may be effected at any time that the roller 266 is in engagement with the portion 286 of the cam 268 or occupies a position on the cam 269 in alignment with the portion 286, the shifting being permitted under these circumstances because of the fact that the radius of the portion 286 of the one cam is the same as the radius of the entire circumference of the other cam.

The timing for shifting the extension 265 between the cams 268 and 269 is the function of a device illustrated in Figs. 35 and 37. Carried on one of the trunnions of the drum 237 is a gear 292 which meshes with a gear 293 on a shaft 294. This shaft has secured thereto a disk 295, and a companion disk 296 is journaled on this shaft and is connected to the latter by a gear train including a pinion 297 secured to one end of the shaft, a gear 298 meshing with said pinion, a pinion 299 secured to the gear 298, and a gear 301 connected to the disk 296. As shown in Fig. 37, the periphery of the disk 295 has a portion 302 of reduced radius, this portion embracing approximately 180° of the periphery of the disk. The disk 296, which over the greater portion of its periphery has the same radius as the greater radius of the disk 295, has a section 303 of reduced diameter, this section embracing a relatively small circumferential portion of the periphery. By reason of their different connections with the shaft 294, as described above, the disks 295 and 296 will rotate at different speeds, the speed of the disk 296 being much slower than that of the disk 295. The peripheries of the disks are engaged by a pair of rollers 304 and 305, both of which are carried at one end of a pivoted lever 306. This lever constitutes one element of a two-way switch which controls the energization of the solenoids 283 and 285. When the roller 304 occupies the recess 303 in the disk 296 and the roller 305 lies against the section 302 of the disk 295 of lesser diameter, the lever will close the circuit of the solenoid 285, as shown in Fig. 37. When on the other hand either of the rollers 304 and 305 engages the portion of greater radius of either of the disks 295 and 296, the lever will be adjusted into a position in which it will close the circuit of the solenoid 283 to the exclusion of the solenoid 285. One or other of the solenoids is thus continuously energized.

By reason of the differential rotations of the disks 295 and 296, the recess 303 of the disk 296 and the portion 302 of the disk 295 will be in position to receive the rollers 304 and 305 at the same time only during a limited angular movement of the drum and only at specified intervals of drum rotation. This limited angular movement of the drum is in the present case somewhat in excess of 180°, and during this time the roller 266 of the lever 262 will lie in contact with the cam 268 and will move over that portion of the cam which embraces the radially reduced section 287 and the relatively elevated section 288. As the roller passes off the section 288 and onto the section 286, the disks 295 and 296 will function to shift the switch lever 306 to the opposite phase, energizing the solenoid 283, thereby bringing the roller 267 onto the cam 269 and maintaining the valve in the aforesaid neutral position. After a predetermined number of revolutions of the drum 237, this cycle will be repeated. As shown in Fig. 33, the cam 268 is so arranged that the roller 266 will pass onto the portion 287 of reduced diameter, when the nozzle 244 is in the position shown in broken lines, this being just rearwardly of the point where the web is parted by the rotary blade 238, and the timing is such that the nozzle 244 will be connected with the suction chamber 245 when and only when the blade is brought into operative position to sever the web. Suction continues until the roller 266 passes onto the elevated portion 288 of the cam 268, at which time the valve is shifted to connect the port 244 with the pressure chamber 246, thereby effecting transfer of the web to a new core, as previously described.

The operating mechanism for the blade 238 is illustrated in Figs. 43 and 44. The arm 239 is attached to a shaft 326 which is suitably journaled in the frame of the machine, and which forms a journal for a gear 327 which meshes with a gear 328 attached to the shaft 329 of the rotary structure of the blade 238. The gear 327 is operatively connected, through a pinion 331, with a gear 332 which is secured to one end of the drum 237 through the medium in the present instance of posts 333 as illustrated in Fig. 44. In this manner the rotary structure of the blade 238 is rotated in timed relation with the drum.

Also secured to the shaft 326 is an arm 334 which carries at its outer end a pair of relatively spaced cam rollers 335 and 336. These rollers are arranged for engagement respectively with cam rings 337 and 338 which are mounted at the end of the drum 237 through the medium of extensions 339 of the posts 333. The arm 334 also carries a pair of solenoids 341 and 342 which are operatively connected to a pivoted lever 343 at opposite sides respectively of the pivot 344. When the solenoid 341 is deenergized and the solenoid 342 is energized the lever is drawn to the position shown in Fig. 44, and when the solenoid 341 is energized and solenoid 342 deenergized, the lever will be moved counterclockwise, as viewed in Fig. 44, to an alternative position now to be defined.

The free end of the lever 343 is connected to a pin 345 which is slidably supported in the terminal bifurcations of the arm and upon which the roller 335 is journaled. The roller 336 is journaled on a sleeve 346 in fixed position for engagement with the cam 338; while the roller 335 is journaled in fixed position on the said pin 345. When the lever 343 is in the position shown in Fig. 44, the roller 335 will be disengaged from the cam 337; but when the energization of the solenoids is reversed, as described above, the pull of the solenoid 341 on the lever 343 shifts the roller 335 to an alternative position wherein the roller 335 moves into engagement with the cam 337.

As indicated in Fig. 43, the cam 338 is circular in form, and the cam 337 is in main part circular and of the same radius as the cam 338, but has an elevation 347 which acts through the lever 334 when the roller 335 is engaged with the cam 337 to move the cutting blade assembly toward the drum and into position wherein the blade 238 may act to sever the web as described. A spring 348 attached to the lever 334 holds the rollers 335 and 336 against the cams.

It is to be noted that except when the elevation 347 of the cam 337 is operative to shift the cutting blade, as described above, the blade assembly will be supported by the cam 338 in a position relatively remote to the drum, as shown in the drawings, wherein the blade is inoperative. The blade is in continuous rotation through the associated gear train in timed relation to the rotary movement of the drum, and the solenoids 341 and 342 may be connected in the same circuit with the solenoids 283 and 285, as shown in Fig. 37, for actuation therewith in obvious manner to effect the required synchronized actuations of the cutting blade and of the valve 241 hereinbefore described.

The matter shown in Figures 43 and 44 and described above is one example of how the web may be parted and the knife synchronized with the operation of the drum. The details of this arrangement form no part of the invention of this application.

In Figs. 39 to 42, inclusive, we have illustrated a desirable form of mandrel for use when desired in place of a core of the character previously described. As shown, the mandrel consists of an elongated tubular body member 307 of rectangular cross section, there being secured in each end of this member a head 308. Adjustably supported in each side wall of the member 307 by means of a longitudinal series of pins 309 is a segmental longitudinal portion 311, said segments together producing the cylindrical contour of the mandrel. Each of the pins 309 has a head 312 at its inner end which limits the outward movement of the associated segment 311 from the wall of the body section 307. The arrangement provides, in effect, for radial expansion and contraction of the mandrel.

In the interior of the body member 307 is a rectangular adjusting bar 313 which constitutes a means for projecting the segmental elements 311 to expand the mandrel, as shown in Fig. 39. Thus when the adjusting bar 313 is turned so that the corners thereof, which preferably are slightly flattened as shown, engage the inner or head ends of the pins 309, the segmental elements 311 are forced away from the sides of the body member 307, and the mandrel is thereby in effect radially expanded. When the adjusting bar 313 is turned about its longitudinal axis through an angle of 45°, the flat sides of the bar will then lie opposite the inner or head ends of the pins 309, and the segments 311 will then be permitted to move radially inward to effect a radial contraction of the mandrel.

As shown in Fig. 40, the ends of the adjusting bar 313 are provided with cylindrical extensions 314 which pass through the heads 308 and are secured respectively in terminal elements 315. A pin 316 is secured in each of the extensions 314, and extends radially therefrom into a circumferential slot 317 in the associated head member 308. This slot embraces an angular portion of the head 308 of 45°, so that the terminal members 315 together with the adjusting bar 313 may be turned with respect to the body member 307 and the heads 308 through an angle of 45° to thereby adjust the bar 313, as described above. A spring 318 is confined between the ends of the bar 313 and the adjoining wall of the proximate head member 308 to thereby create friction between the said heads and the adjusting bar tending to retain the bar in adjusted position with respect to the body member 307.

The terminal elements 315 are cup-shaped, as shown in Fig. 40, and the terminal flange is serrated so as to afford a circumferential series of relatively spaced pointed projections 319. These projections 319 on the terminal elements 315 are adapted to interengage with a corresponding series of projections 321 at the ends of the adjustable sleeves 322 of trunnion elements 323, these elements corresponding to the reel trunnions 79 previously described, and being correspondingly suppported on the reel. In the present instance, the sleeves 322 may be advanced and retracted for engagement and disengagement respectively with the ends of the mandrel 258 through the medium of a lever 324. It will be noted that when the trunnion sleeves 322 are interlocked with the terminal elements 315 of the mandrel, as shown in Fig. 40, the mandrels are positively held in axially aligned position on the trunnions 323.

The mandrel is adapted to be rotated in the reel in the direction indicated by the arrow in Fig. 41. Thus the torque imposed upon the terminal elements 315 and therethrough upon the adjusting bar 313 and its extensions 314 will tend to maintain the adjusting bar and the body member 307 in the relative positions shown in Figs. 39 and 40, it being noted that the drag of the web upon the body of the mandrel will aid in maintaining the parts in these relative positions. Thus during the winding operation, the mandrel will tend to remain in the expanded position as shown. When the roll is completed, the mandrel may be collapsed by turning the heads 315 in the opposite direction with respect to the heads 308, which will result in a collapse of the mandrel so that the latter may be readily withdrawn from the roll.

It will be apparent that other types of mandrel may be employed without departure from the invention, and this applies also to the other parts of the machine, which may be substantially modified as to form without departure from the principles of the invention.

We claim:

1. In apparatus for winding individual rolls from a web, a drum about which the web is fed, means for delivering a core against the drum, means for instituting winding of the web upon the core, and means exclusive of the roll and operative during the winding operation and synchronized with the rotary movement of the drum for effecting retractive movement of the core from the drum at a rate predeterminedly related to the increasing linear content of the roll.

2. In apparatus for winding individual rolls from a web, a drum about which the web is fed, rotary core-supporting means, means for advancing said support to deliver a core against the drum, means for instituting winding of the web upon the core, and means synchronized with the rotary movement of the drum and exclusive of the roll for effecting retractive movement of said support with respect to the drum at a rate predeterminedly related to the increasing linear content of the roll.

3. In apparatus for winding individual rolls from a web, a drum about which the web is fed, means for periodically delivering a core against the drum, means for parting the web from a previously wound roll and for instituting winding of the web upon the core, said delivery means comprising a carrier movable in a predetermined path with respect to the drum, a rotary support for said core movably mounted on the carrier, and means for predeterminately bodily moving the support on the carrier in timed relation with the movement of the latter.

4. In apparatus for winding individual rolls from a web, a drum about which the web is fed, means for periodically delivering a core against the drum, means for parting the web from a previously wound roll and for instituting winding of the web upon the core, said delivery means comprising a rotary carrier, a rotary support for said core movably mounted on the carrier, means for rotating the carrier in timed relation with the drum, and means for predeterminately bodily moving the said support on the carrier in timed relation with the movement of the latter.

5. In apparatus for winding individual rolls from a web, a drum about which the web is fed, means for periodically delivering a core against the drum, means for parting the web from a previously wound roll and for instituting winding of the web upon the core, said delivery means comprising a rotary carrier, and means for rotating said carrier in timed relation with the rotation of the drum, a plurality of supports for said cores arranged in circumferential series on the carrier and each movably mounted on the latter, and means operative after the core has engaged the web on the drum for predeterminately bodily moving the said support on the carrier with respect to the drum and in timed relation with the movement of the latter.

6. In apparatus for winding individual rolls from a web, a drum about which the web is fed, means for periodically delivering a core against the drum, means for parting the web from a previously wound roll and for instituting winding of the web upon the core, said delivery means comprising a rotary carrier, a rotary support for said core movably mounted on the carrier, and a relatively fixed cam operatively associated with said support for predeterminately bodily moving the support on the carrier in timed relation with the movement of the latter.

7. In apparatus for winding individual rolls from a web, a drum about which the web is fed, means for periodically delivering a core against the drum, means for parting the web from a previously wound roll and for instituting winding of the web upon the core, said delivery means comprising a rotary carrier, a plurality of rotary core-supporting means movably mounted in circumferential series on the carrier, and a relatively fixed cam operatively associated with said supports for periodically moving the said supports on the carrier and with respect to the drum in a predetermined path and in timed relation with the movement of the drum.

8. In apparatus for winding individual rolls from a web, a drum about which the web is fed, means for periodically delivering a core against the drum, means for parting the web from the previously wound roll and for instituting winding of the web upon the core, said delivery means comprising a carrier movable in a predetermined path with respect to the drum, a pair of axially spaced and aligned spindles carried by said carrier and affording a rotary support for said core, and means for periodically axially retracting and advancing said spindles.

9. In apparatus for winding individual rolls from a web, a drum about which the web is fed, means for periodically delivering a core against the drum, means for parting the web from a previously wound roll and for instituting winding of the web upon the core, said delivery means comprising a carrier movable in a predetermined path with respect to the drum, a pair of axially spaced and aligned spindles mounted on said carrier and constituting a support for said core, and mechanism for periodically retracting and advancing said spindles upon the carrier in timed relation with the movement of the latter.

10. In apparatus for winding individual rolls from a web, a drum about which the web is fed, means for periodically delivering a core against the drum, means for parting the web from a previously wound roll and for instituting winding of the web upon the core, said delivery means comprising a carrier movable in a predetermined path with respect to the drum, a pair of axially spaced and aligned spindles mounted on the carrier and forming a rotary core support, means for retaining a core in the path of said spindles, and means for periodically actuating the spindles so as to cause the latter to enter the respective ends of the core and thereby pick up the latter.

11. In apparatus for winding individual rolls from a web, a drum about which the web is fed, means for periodically delivering a core against the drum, means for parting the web from a previously wound roll and for instituting winding of the web upon the core, said delivery means comprising a rotary support for said core, and means exclusive of the roll for traversing said support in a predetermined path with respect to the drum surface, and caging means operating in conjunction with said delivery means for confining the core against the drum.

12. In apparatus for winding individual rolls from a web, a drum about which the web is fed, means for periodically delivering a core against the drum, means for parting the web from a previously wound roll and for instituting winding of the web upon the core, said delivery means comprising a carrier movable in a predetermined path with respect to the drum, a rotary support for said core movably mounted on the carrier, and means exclusive of the roll for predeterminately moving the support on the carrier so as to compensate for build-up of the roll on the core and to thereby control the diametrical dimension of the roll.

13. In apparatus for winding individual rolls from a web, a drum about which the web is fed, means for periodically delivering a core against the drum, said means comprising a rotary support for said core, and means for periodically advancing and retracting the support with respect to the drum, means automatically movable to a position overlying the core as the latter is delivered to the drum to guide the web about the core, pneumatic means operatively associated with said guide means for parting the web from a previously wound roll and for directing the web between the core and guide means to institute winding of the web upon the core, and means for subsequently retracting said guide means.

14. In apparatus for winding individual rolls from a web, a drum about which the web is fed, means for periodically delivering a core against the drum, said delivery means comprising a rotary support for said core, and means for periodically advancing and retracting the support with respect to the drum, caging means for confining the core against the drum, and pneumatic means operatively associated with said caging means for parting the web from a previously wound roll and for instituting winding of the web upon the core.

15. In apparatus for winding individual rolls from a web, a drum about which the web is fed, means for delivering successive cores against the drum, said means comprising a rotary carrier, a plurality of oscillatory members mounted in circumferential series on the carrier, a rotary core support carried by each of said members, a relatively fixed cam for oscillating said members in timed relation with the rotation of the carrier, means for rotating said carrier in timed relation with the drum, and means for parting the web from a previously wound roll and for instituting winding of the web upon a succeeding core.

16. In apparatus for winding individual rolls from a web, a drum about which the web is fed, means for periodically delivering a core against the drum, and means for parting the web from a previously wound roll and for instituting winding of the web upon the core, said delivery means comprising a rotary carrier, a plurality of rotary core supports mounted in circumferential series on said carrier and each movable bodily with respect to the latter, and mechanism for intermittently rotating the said supports in timed relation with the movement of said carrier.

17. In apparatus for winding individual rolls from a web, a drum about which the web is fed, means for periodically delivering a core against the drum, and means for parting the web from a previously wound roll and for instituting winding of the web upon the core, said delivery means comprising a rotary shaft, a reel carried by said shaft, a plurality of rotary core supports mounted on the reel in circumferentially arranged series, means coaxial with said shaft for rotating said supports, said means including a separate clutch for each of said supports controlling the connection thereof with said rotating means, and a relatively fixed cam operatively associated with the clutch for intermittently engaging and disengaging the latter.

18. In apparatus for winding individual rolls from a web, a drum about which the web is fed, means for periodically delivering a core against the drum, and means for parting the web from a previously wound roll and for instituting winding of the web upon the core, said delivery means comprising a reel, a plurality of shafts journaled in said reel in circumferential series, mechanism for rotating said shafts independently of the rotation of the reel, a member embracing each of said shafts and supported in the reel for oscillation about the shaft axis, core-supporting spindles journaled in said oscillating members, said spindles being retractable from a normally extended position, means including a clutch for operatively connecting each of the shafts with its associated spindle, and relatively fixed cams operatively connected respectively with said clutches, with said oscillating members and with said spindles for effecting an intermittent actuation of the clutch, intermittent oscillation of said members and intermittent retraction and extension of said spindles.

19. In apparatus for winding individual rolls from a web, a drum about which the web is fed, means for periodically delivering a core against the drum, said delivery means comprising a carrier and rotary core-supporting means mounted on the carrier, caging means independent of the carrier for engaging and confining the core against the drum, a baffle operatively associated with said caging means, and pneumatic means coactive with said baffle for parting the web from a previously wound roll and for instituting winding of the web upon the core.

20. In apparatus for winding individual rolls from a continuously traveling web, a drum about which the web is fed, means for periodically delivering a core to a predetermined position with respect to the web, pneumatic means carried by the drum and operative when the core reaches said position for instituting the winding of the web on the core, and electrical means operating in timed relation with the movement of the web for actuating said pneumatic means.

21. In apparatus for winding individual rolls from a web, a continuously driven drum to which the web is fed, means for periodically delivering a core against the drum, means for pressing the core upon the web and against the drum at a position spaced from a previously wound roll, pneumatic means for parting the web between the said wound roll and the core and for directing the free end of the web about the core, and electrical means operating in synchronism with the rotation of the drum for actuating said pneumatic means.

22. In apparatus for winding individual rolls from a web, a continuously driven drum about which the web is fed, means for winding successive lengths of the web against the drum to produce the rolls, means for parting the web to free each of the completed rolls and to provide a free end for initiation of a succeeding winding operation, and means for retaining said free end against the drum preparatory to and for initiating said winding operation, said means comprising an axially extending port in the surface of the drum, a suction chamber in said drum, a pressure chamber in said drum, and valve means for selectively connecting the said port with the suction and pressure chambers.

23. In apparatus for winding individual rolls from a web, a continuously driven drum about which the web is fed, and means for winding successive lengths of the web against the drum to produce the rolls, said means comprising mechanism for parting the web, and suction and fluid pressure means carried by the drum and operative successively upon the free leading end of the web.

24. In apparatus for winding individual rolls from a web, a continuously driven drum about which the web is fed, means for periodically delivering a core against the drum, means for winding successive lengths of the web on said cores to produce the rolls, means for parting the web to free the finished rolls, suction means for retaining the leading free end of the web against the drum while said end approaches the succeeding core, and fluid pressure means operative on said free end to initiate the winding operation upon said core.

25. In apparatus for winding individual rolls from a web, a continuously driven drum about which the web is fed, means for periodically delivering a core against the drum, means for winding successive lengths of the web on said cores to produce the rolls, means for parting the web to free the finished rolls, suction means for retaining the leading free end of the web against the drum while said end approaches the succeeding core, and fluid pressure means operative on said free end to initiate the winding operation upon said core, said suction and pressure means comprising a common port in the surface of said drum, and valve means carried by the drum and controlling the connection of said port with the sources of said suction and pressure respectively.

26. In apparatus for winding individual rolls from a web, the combination with a rotary drum about which the web is fed, suction and pressure chambers in the drum, a port in the surface of said drum, channels extending from the respective chambers, a valve selectively controlling the connection of said channels with the port, means for periodically parting the web upon the drum, and means for actuating said valve in timed relation with said parting means to first apply suction to the leading free end of the web to retain it against the drum, and for subsequently applying pressure to said free end to initiate a winding operation.

27. In apparatus for winding individual rolls from a web, the combination with a rotary drum about which the web is fed, suction and pressure chambers in the drum, a port in the surface of said drum, channels extending from the respective chambers, a valve selectively controlling the connection of said channels with the port, means for periodically parting the web upon the drum, and means for actuating said valve in timed relation with said parting means to first apply suction to the leading free end of the web to retain it against the drum, and for subsequently applying pressure to said free end to initiate a winding operation, said valve-actuating means comprising a lever carried by the drum, a pair of relatively fixed cams controlling the position of said lever, and means operating in synchronism with the rotation of the drum for controlling the position of said lever with respect to said cams.

28. In apparatus for winding individual rolls from a web, the combination with a rotary drum about which the web is fed, of means for winding successive lengths of said web against the drum to form said rolls, said means comprising pressure and suction chambers in the drum, a port in the surface of said drum, and valve means for selectively controlling the connection of said port with the suction and pressure chambers, and means for actuating said valve in timed relation with the rotation of the drum, said actuating means comprising a valve-actuating lever on the drum, a pair of relatively fixed cams operative individually to control the position of said lever, and electrical means operatively associated with the drum for periodically shifting said lever from each of said cams to the other.

29. In apparatus for winding individual rolls from a web, the combination with a rotary drum about which the web is fed, of means for winding successive lengths of said web against the drum to form said rolls, said means comprising pressure and suction chambers in the drum, a port in the surface of said drum, and valve means for selectively controlling the connection of said port with the suction and pressure chambers, and means for actuating said valve in timed relation with the rotation of the drum, said actuating means comprising a valve-actuating lever on the drum, a pair of relatively fixed cams operative individually to control the position of said lever, an electric motor operative when energized to move the lever into operative engagement with one of said cams, a second electric motor operative when energized to move the lever into operative engagement with the other of said cams, an electric switch operative in alternative positions to energize said motors respectively, and means for actuating said switch in synchronism with the rotation of the drum, said last-named means comprising a pair of coaxial disks, means for rotating both of said disks from the drum but at differing angular velocities, a recess in the periphery of each of said disks, and a switch-actuating lever engaging both of said peripheries and operative only when occupying both of said recesses to actuate the switch to energize one of said motors, said lever otherwise being operative to energize the other of said motors.

30. In apparatus for winding individual rolls from a continuously traveling web, a rotary drum around which the web is fed, means for longitudinally slitting the web against the drum, means for winding the longitudinally divided portions of the web into rolls of predetermined paper content, means for parting the web from each of the completed rolls and for initiating a succeeding winding operation, and suction means operatively associated with the drum for retaining the longitudinal sections of the slitted web against the surface of the drum as the said sections advance to the winding position.

31. In apparatus for winding individual rolls from a web, a drum about which the web is fed, means for periodically delivering a core against the drum, said delivery means comprising a rotary support for said core and means for periodically advancing and retracting the support with respect to the drum, caging rolls for confining the core against the drum, and pneumatic means operatively associated with said caging rolls for parting the web from a previously wound roll and for instituting winding of the web upon the core.

32. In apparatus for winding individual rolls from a web, a drum about which the web is fed, means for periodically delivering a core against the drum, said delivery means comprising a carrier, a rotary-core-supporting means mounted on the carrier, caging rolls independent of the carrier for engaging and confining the core against the drum, a baffle operatively associated with said caging rolls and pneumatic means coactive with said baffle for parting the web from a previously wound roll and for instituting winding of the web upon the core.

33. In apparatus for winding individual rolls from a web, a drum about which the web is fed, means for longitudinally slitting the web against the drum, means for periodically delivering a core against the drum and upon the longitudinal subdivisions of the slitted web, said delivery means comprising a rotary support for said core, and means for periodically advancing and retracting the support with respect to the drum, caging means for confining the core against the drum, and pneumatic means operatively associated with said caging means for parting the web and for instituting winding of the said subdivisions upon the core.

34. In apparatus for winding individual rolls from a web, a drum about which the web is fed, means for periodically delivering a core against the drum, means for parting the web from a previously wound roll and for instituting winding of the web upon the core, said delivery means comprising a rotary support for said core, and means exclusive of the roll for traversing said support in a predetermined path with respect to the drum surface, and caging means independent of said support for confining the core against the drum.

35. In apparatus for winding individual rolls from a web, the combination with a rotary drum upon which the web is fed, of means for periodically parting the web on the drum, means for periodically delivering a core against the drum, fluid pressure means in the drum operative on the leading end of the web after each said partition to institute winding of the web upon the successive cores, and suction means carried by the drum for retaining the said leading end of the web against the surface of the drum pending transfer thereof to the core by said pressure means.

WESLEY S. CORBIN.
PAUL L. TOLLISON.
ALFRED F. PILON.
FRANCIS CHILSON.
CHARLES S. CAFFREY.